Mar. 6, 1923.
C. W. GRAHAM
1,447,381
AUTOMATIC MACHINE FOR CUTTING PAPER GASKETS
Filed Apr. 22, 1918    16 sheets-sheet 4
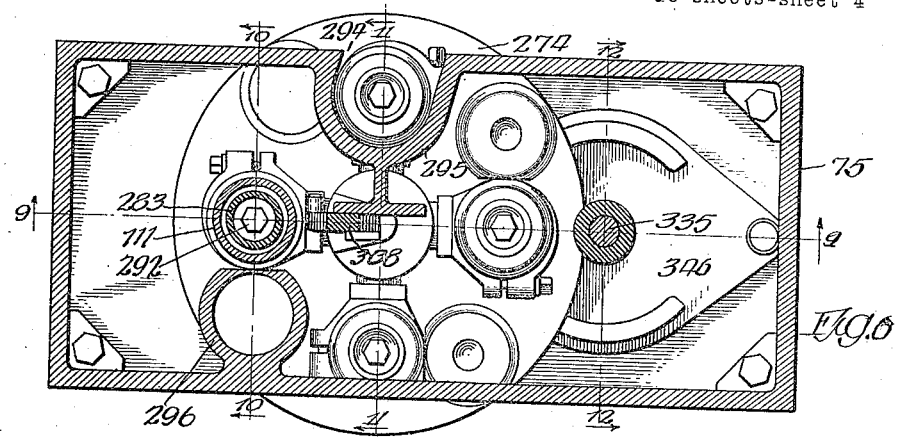
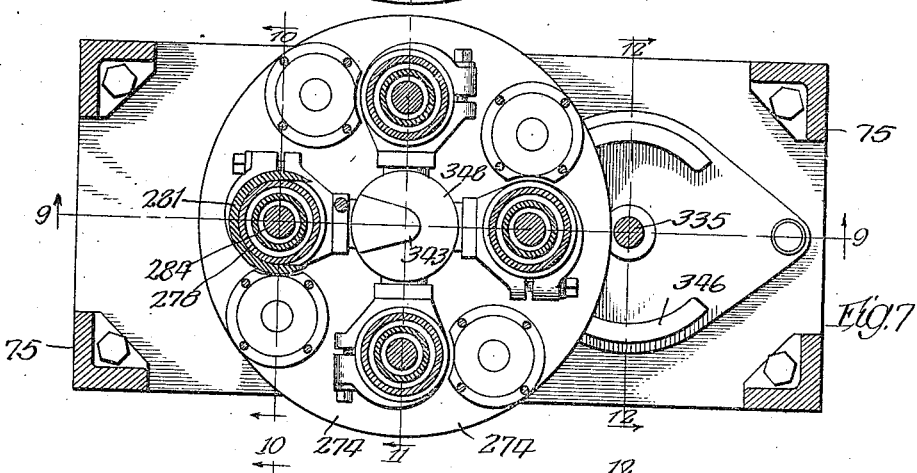
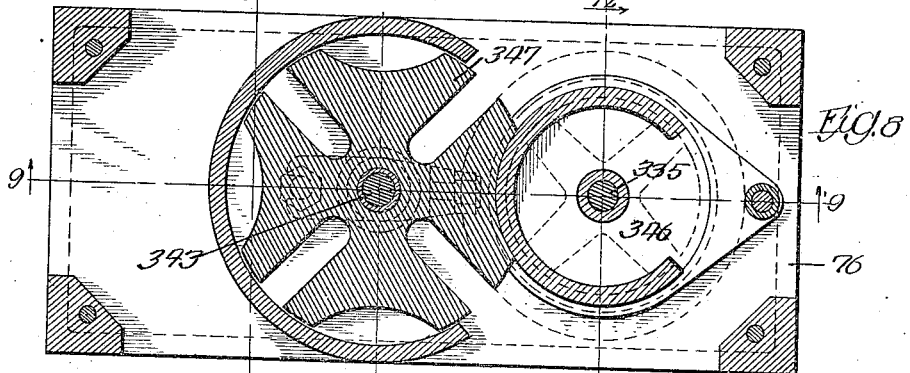
WITNESSES:
INVENTOR
Charles W. Graham
BY
ATTORNEY

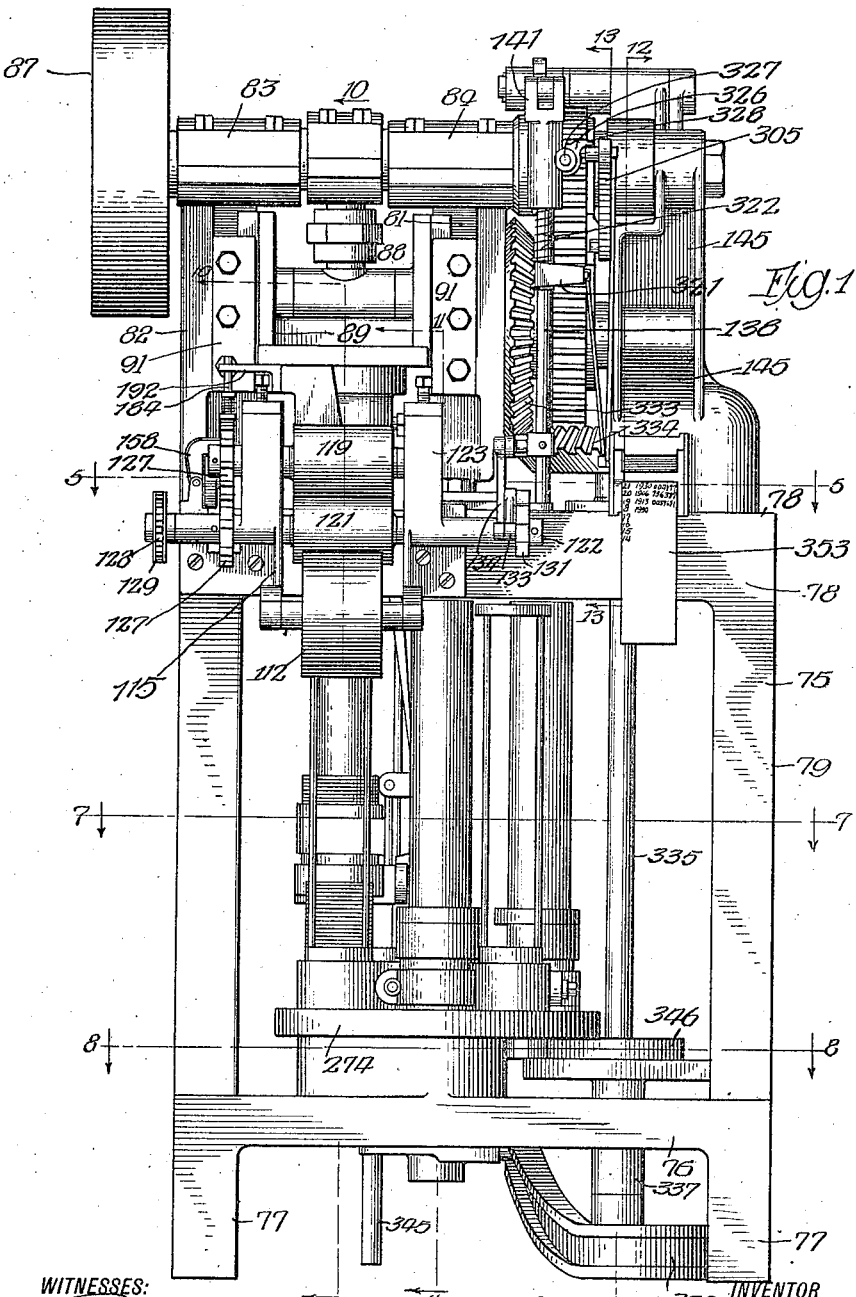

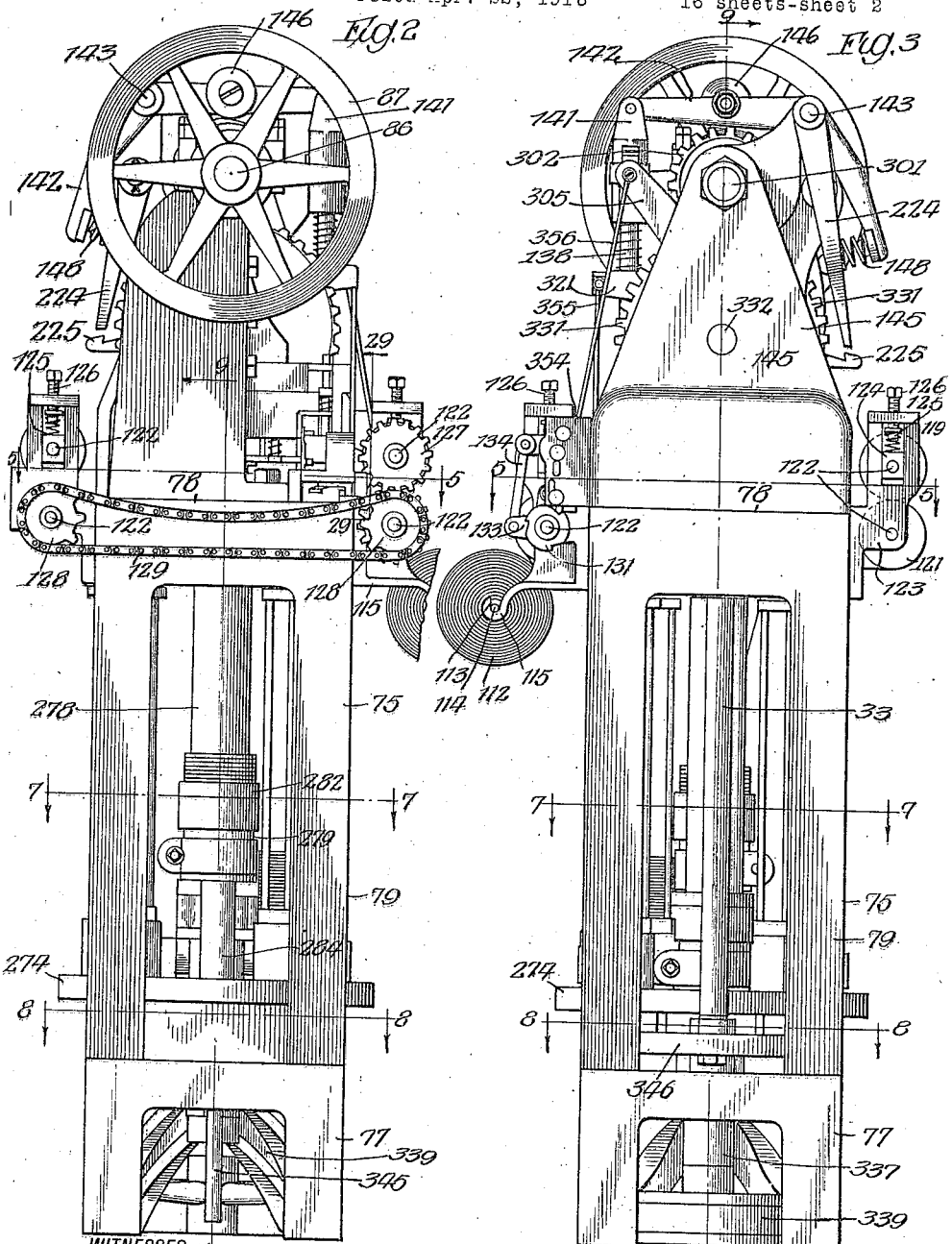

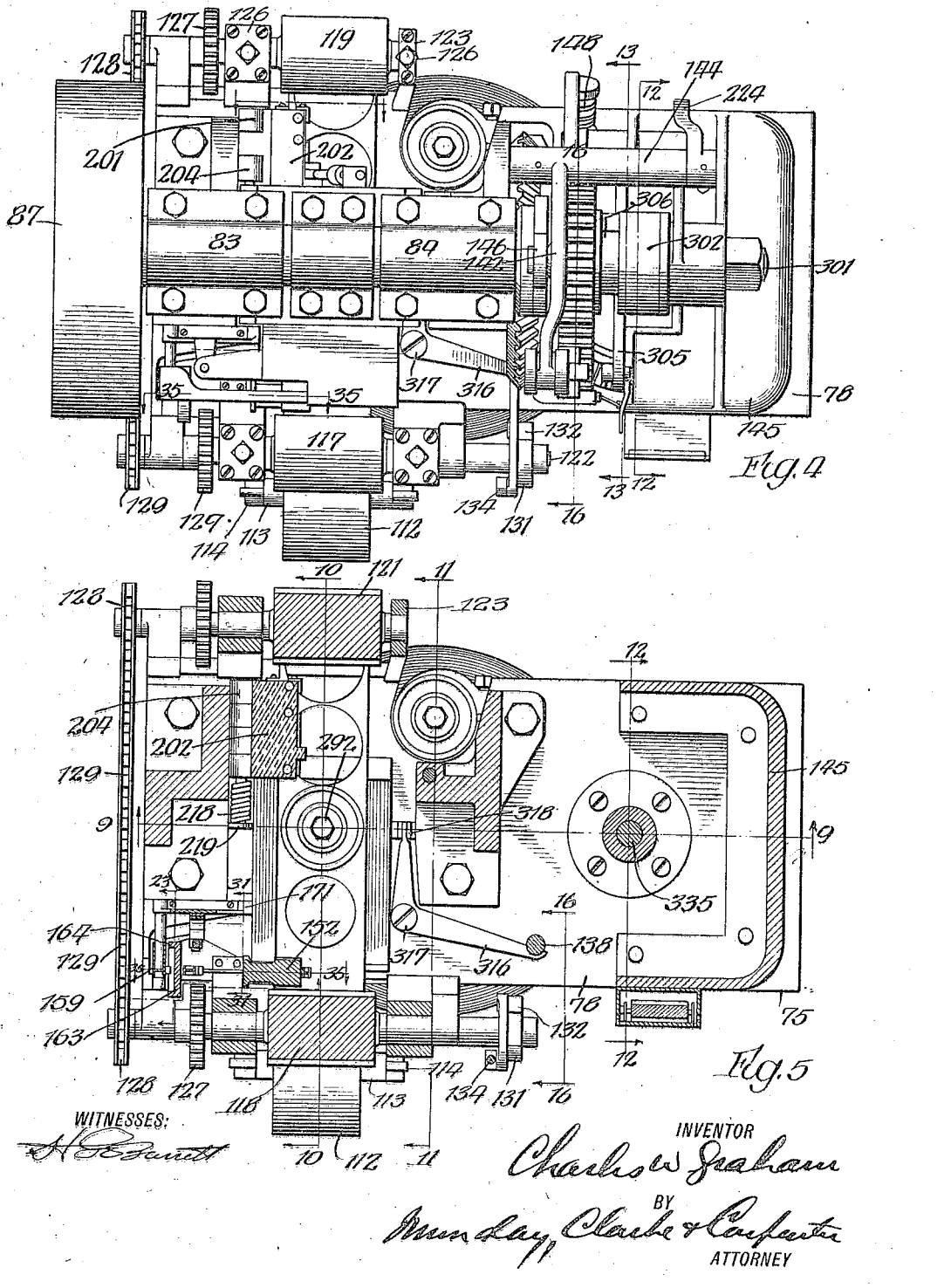

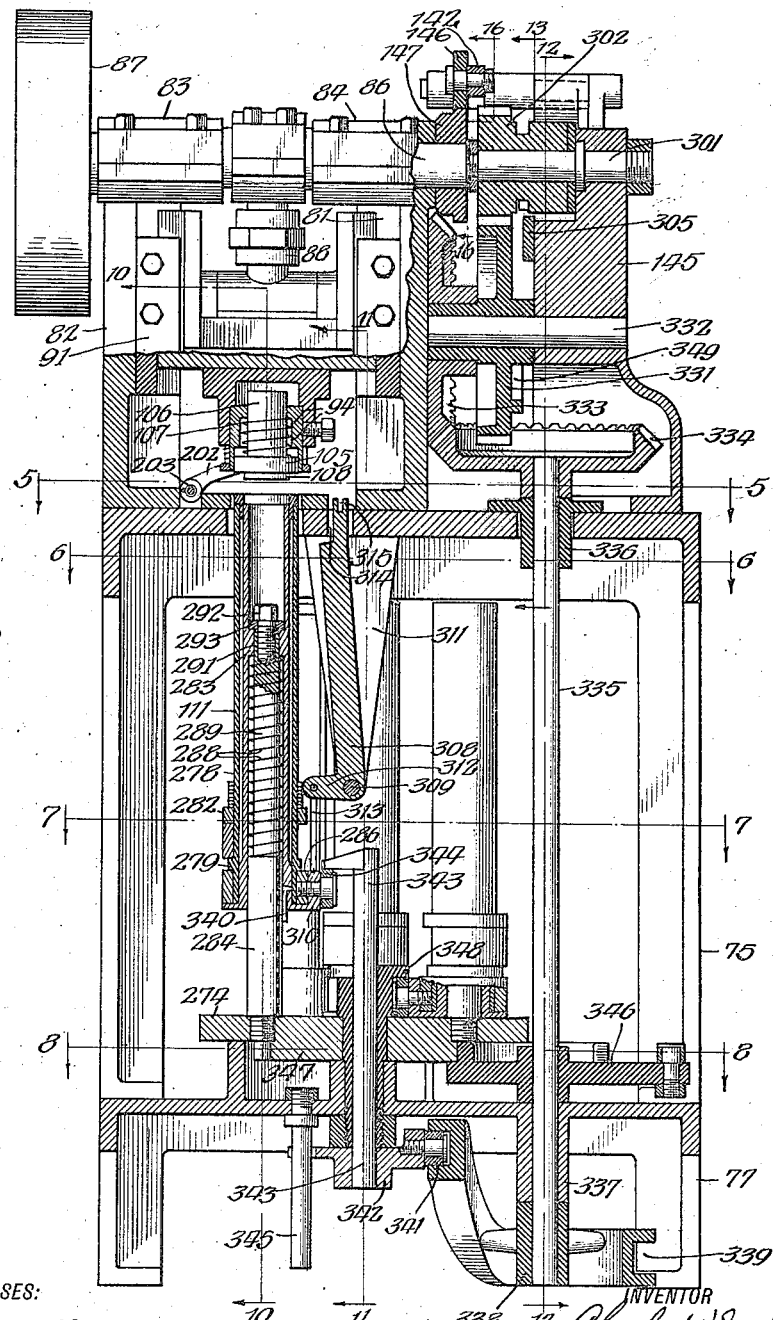

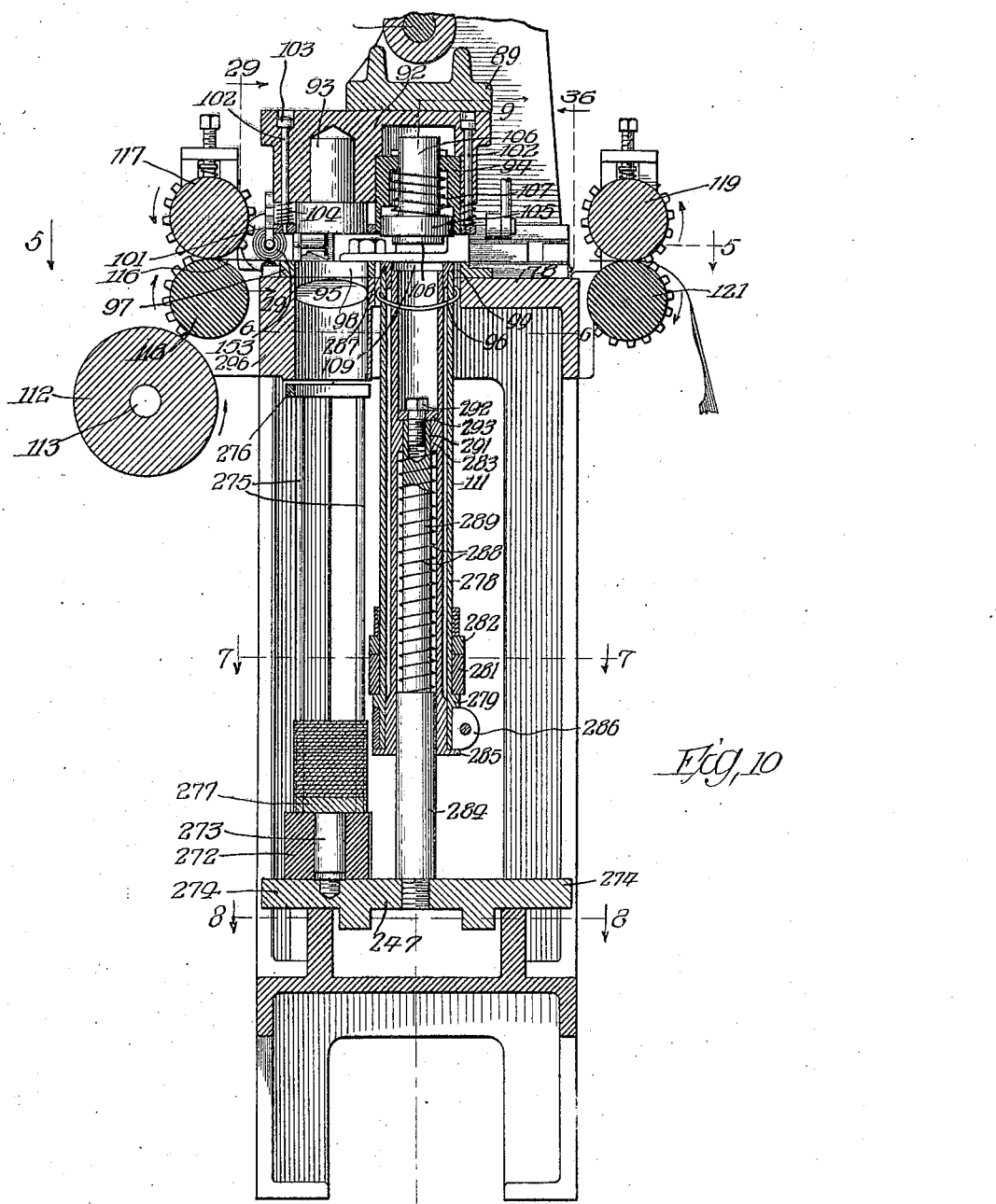

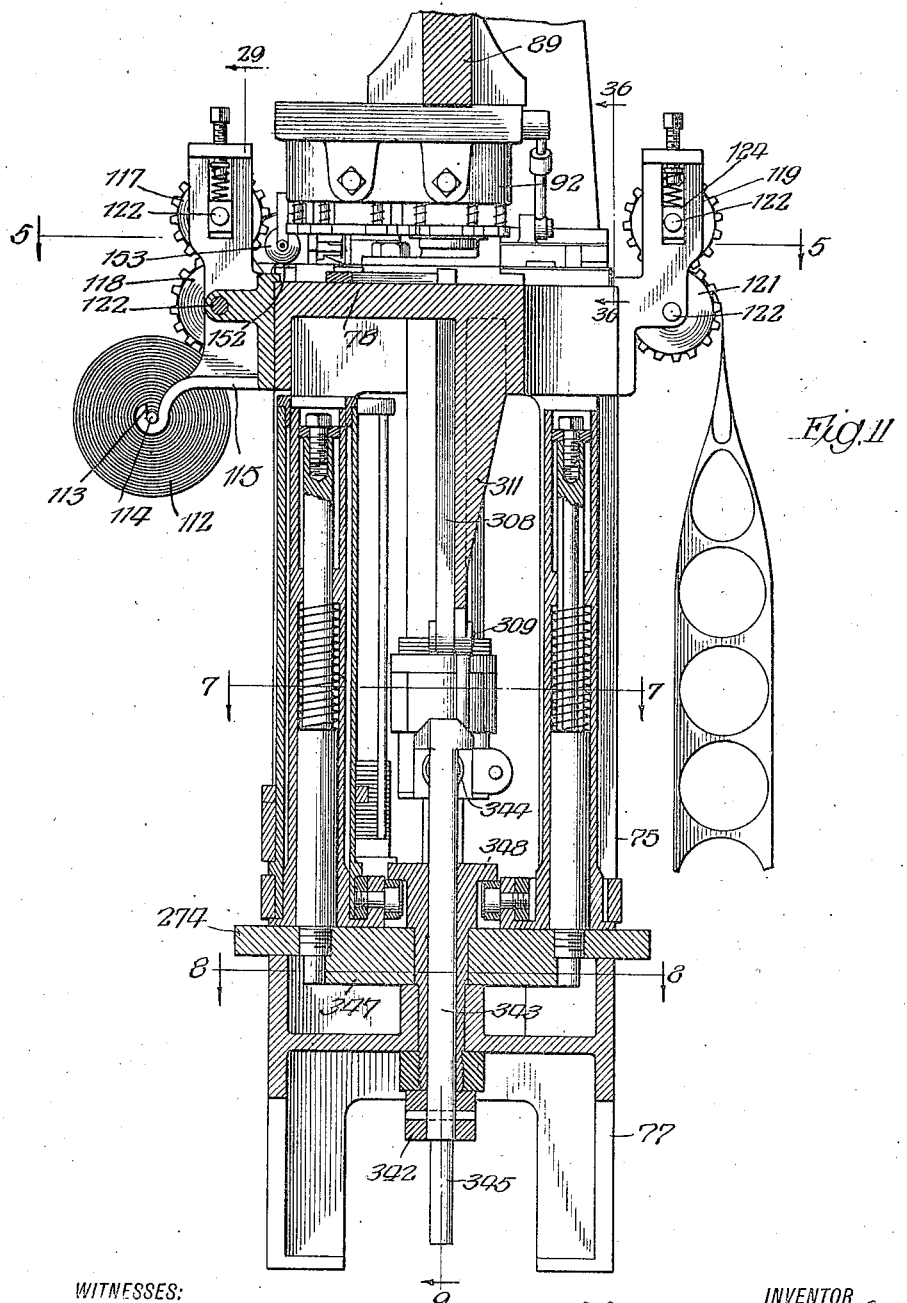

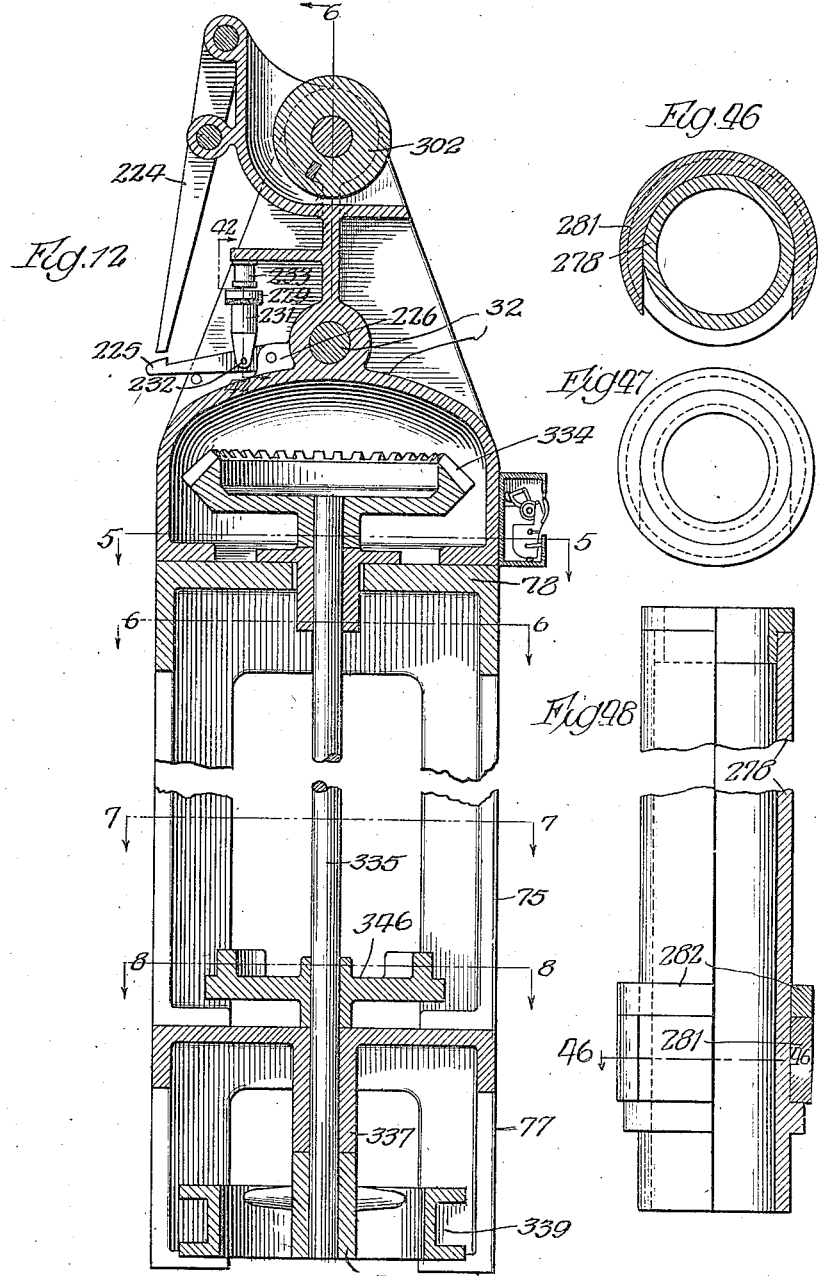

Mar. 6, 1923.  
C. W. GRAHAM  
AUTOMATIC MACHINE FOR CUTTING PAPER GASKETS  
Filed Apr. 22, 1918  
1,447,381  
16 sheets-sheet 9
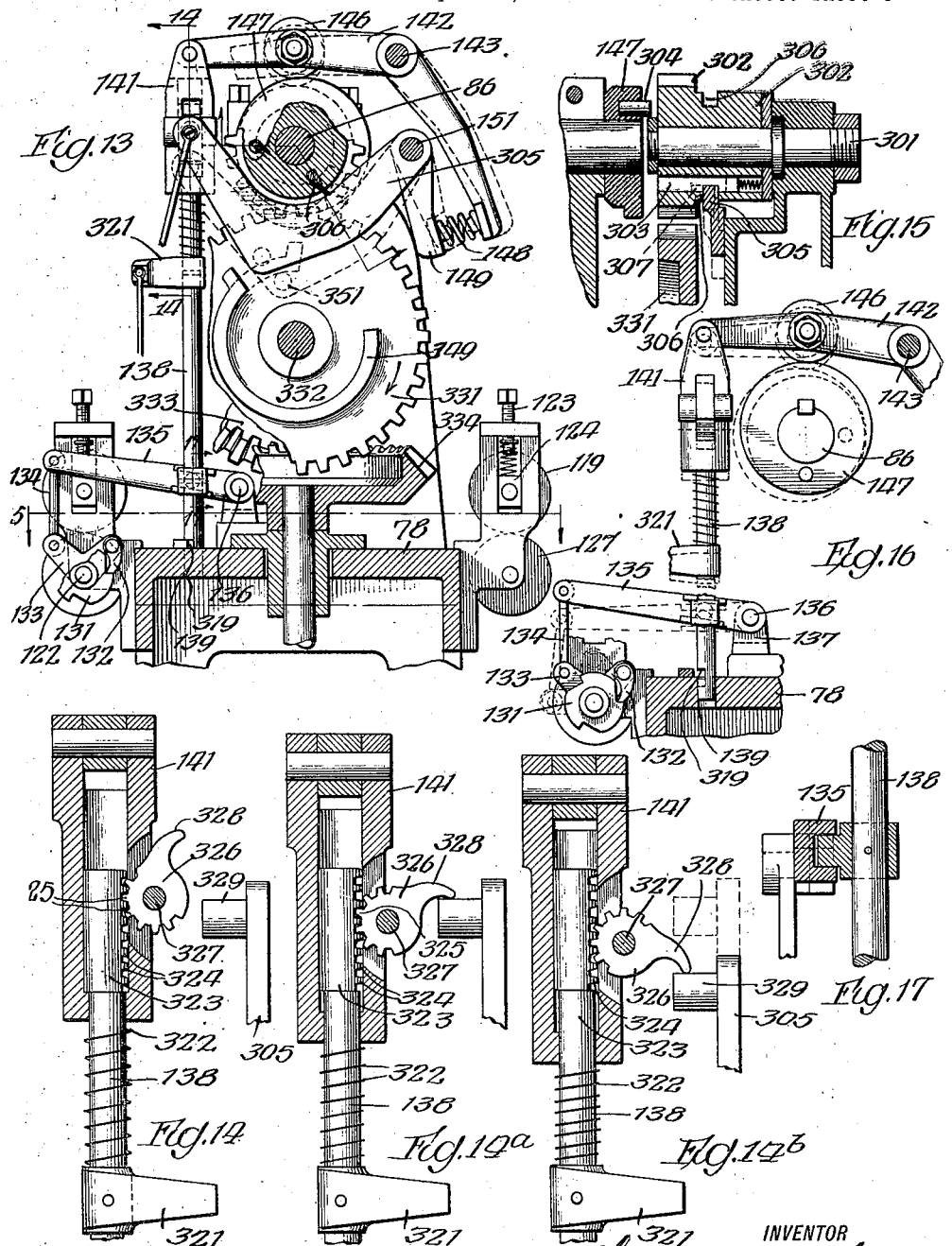
INVENTOR  
Charles W. Graham  
BY  
Munday Clark & Carpenter  
ATTORNEY Mar. 6, 1923.
C. W. GRAHAM
1,447,381
AUTOMATIC MACHINE FOR CUTTING PAPER GASKETS
Filed Apr. 22, 1918          16 sheets-sheet 10
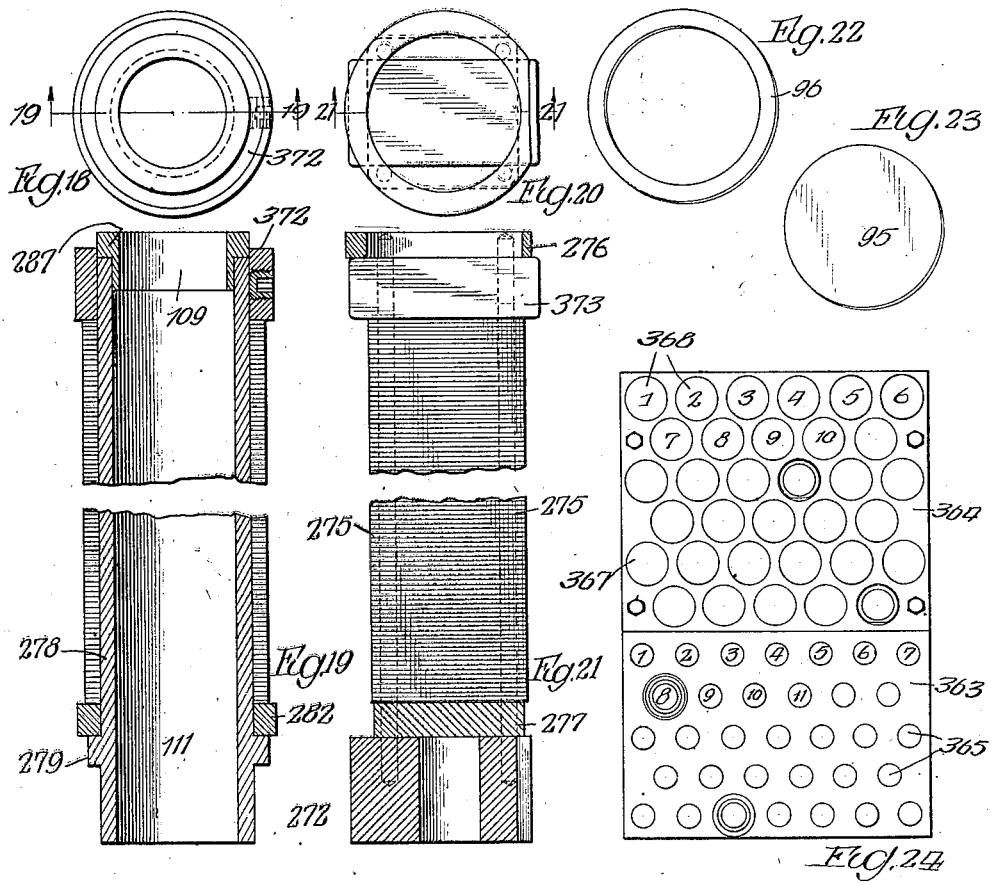
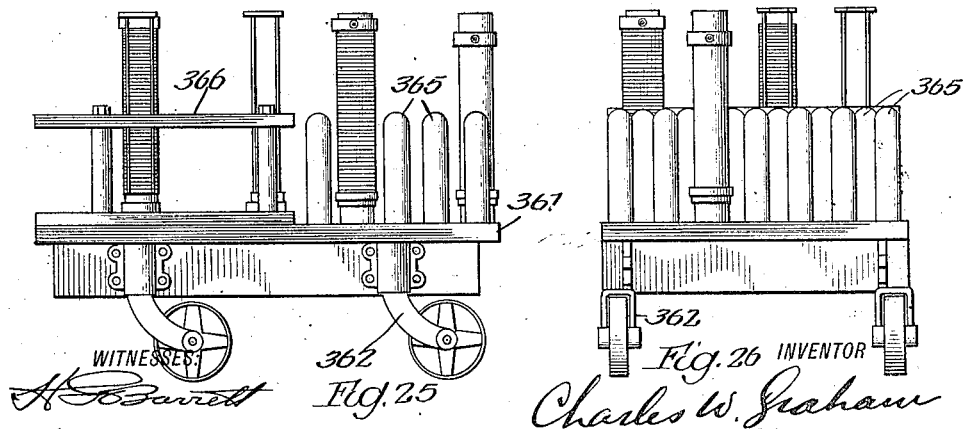

Mar. 6, 1923.                                               1,447,381
                        C. W. GRAHAM
             AUTOMATIC MACHINE FOR CUTTING PAPER GASKETS
                   Filed Apr. 22, 1918     16 sheets-sheet 11

| 23 | 1892 | 0045025 |
|----|------|---------|
| 22 | 1886 | 0043133 |
| 21 | 1890 | 0041247 |
| 20 | 1906 | 0039357 |
| 19 | 1973 | 0037451 |
| 18 | 1970 | 0035478 |
| 17 | 1976 | 0033508 |
| 16 | 1966 | 0031432 |
| 15 | 1980 | 0029566 |
| 14 | 1943 | 0027586 |
| 13 | 1970 | 0025643 |
| 12 | 1953 | 0023673 |
| 11 | 1961 | 0021720 |
| 10 | 1984 | 0019759 |
| 9  | 1965 | 0017775 |
| 8  | 1957 | 0015810 |
| 7  | 1949 | 0013853 |
| 6  | 1993 | 0011904 |
| 5  | 1989 | 0009911 |
| 4  | 1997 | 0007922 |
| 3  | 1992 | 0005925 |
| 2  | 1989 | 0003933 |
| 1  | 1944 | 0001944 |

INVENTOR
Charles W Graham
BY
Munday, Clarke & Carpenter
ATTORNEY

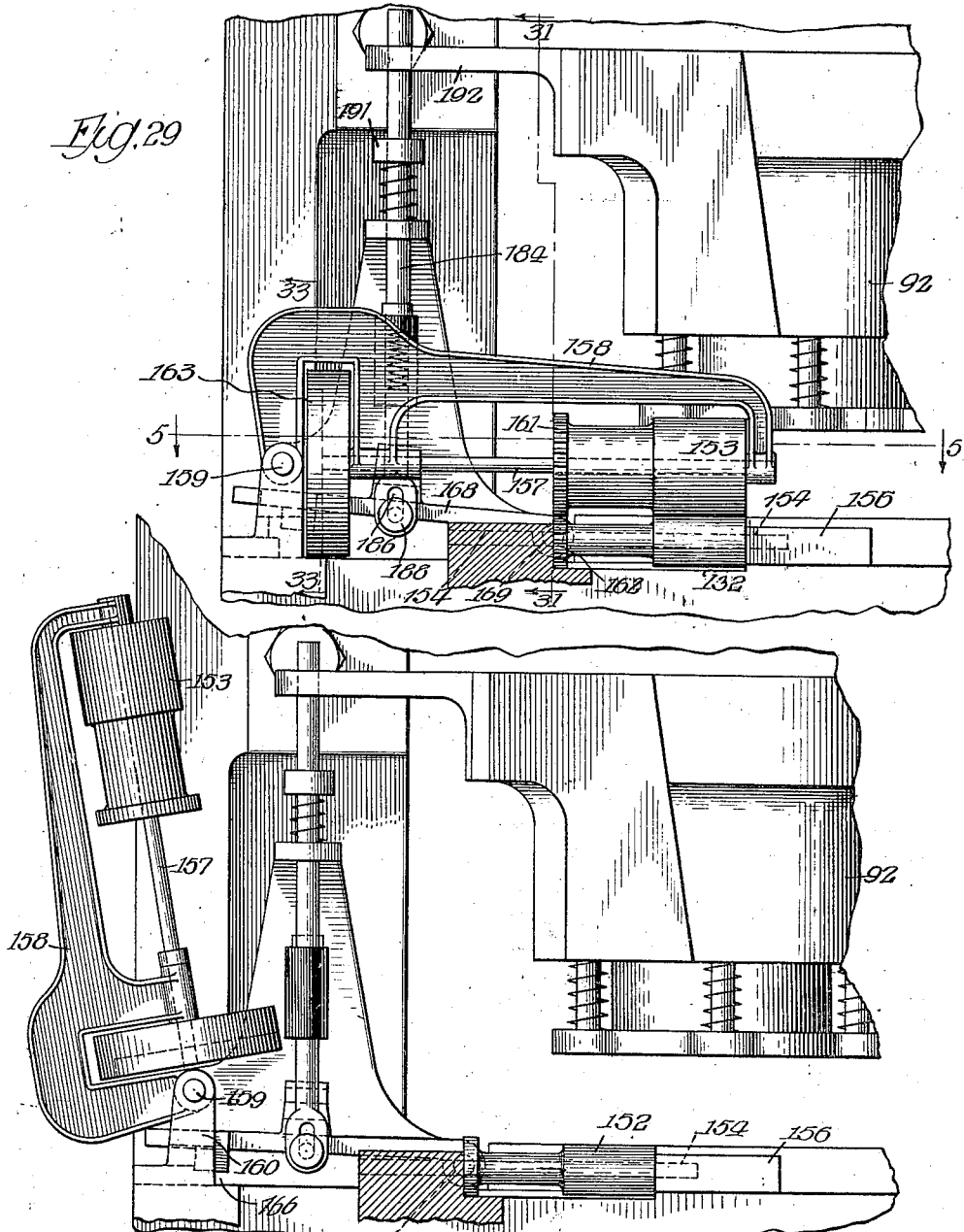

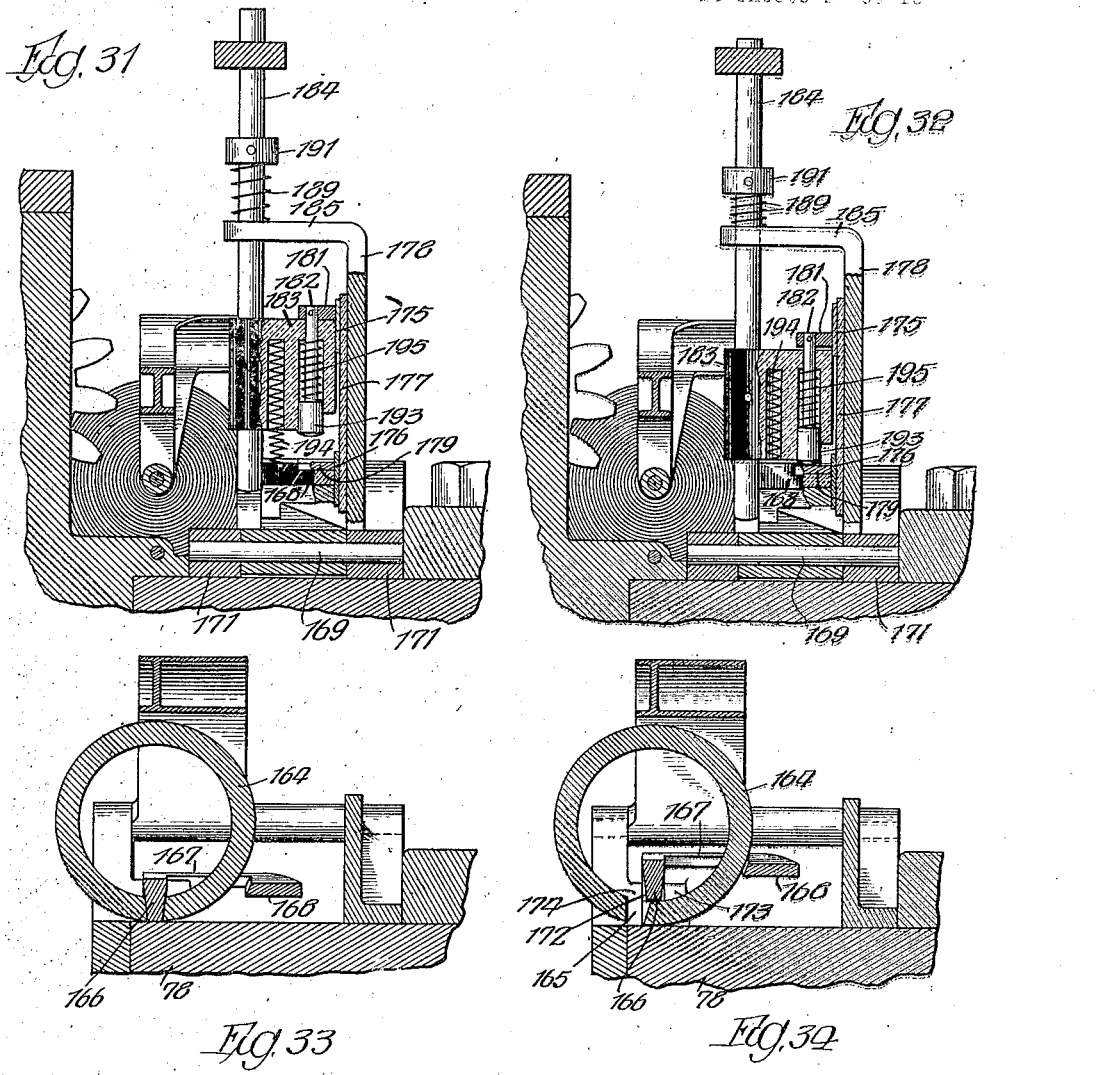

Mar. 6, 1923.
C. W. GRAHAM
1,447,381
AUTOMATIC MACHINE FOR CUTTING PAPER GASKETS
Filed Apr. 22, 1918     16 sheets-sheet 14
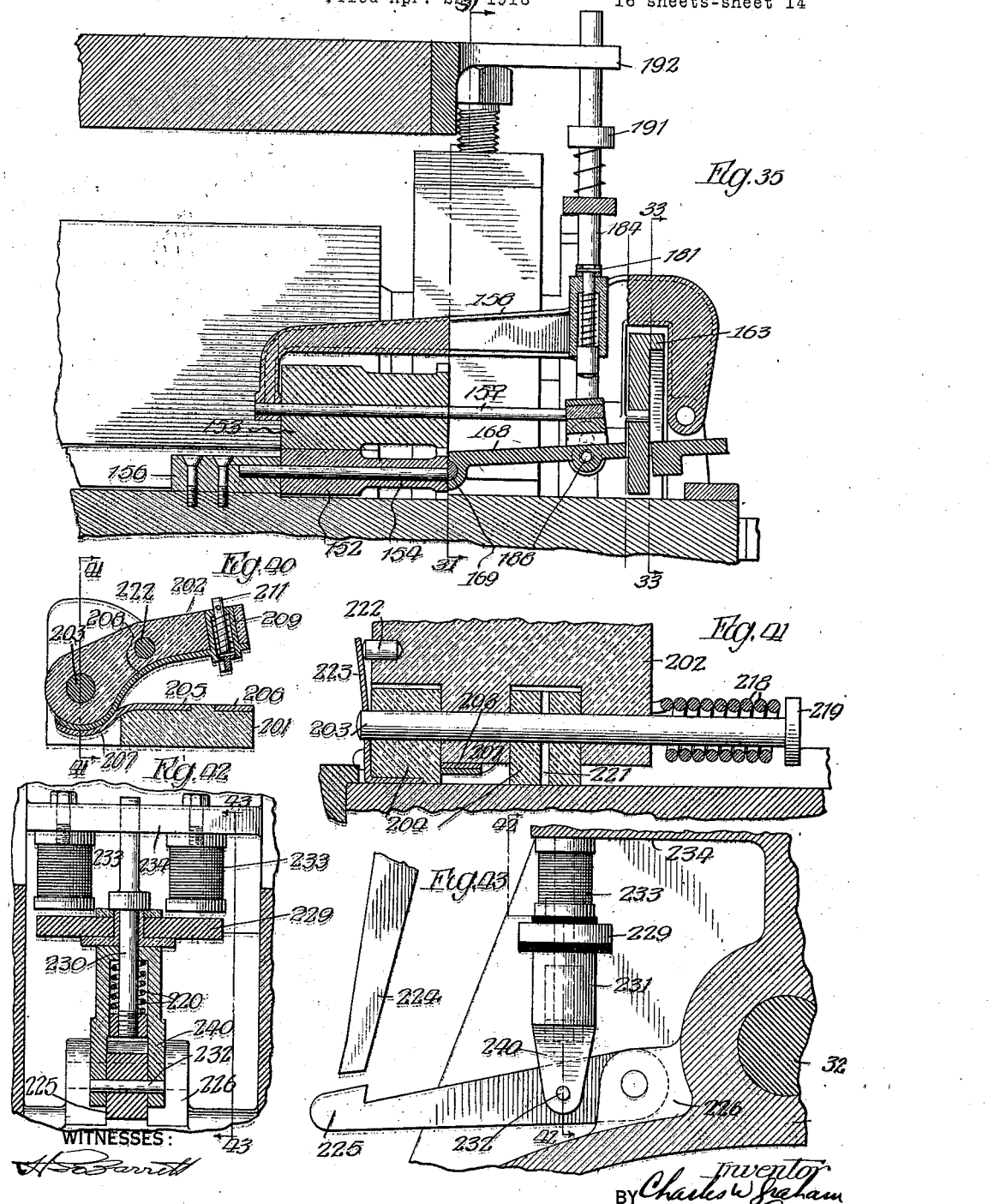

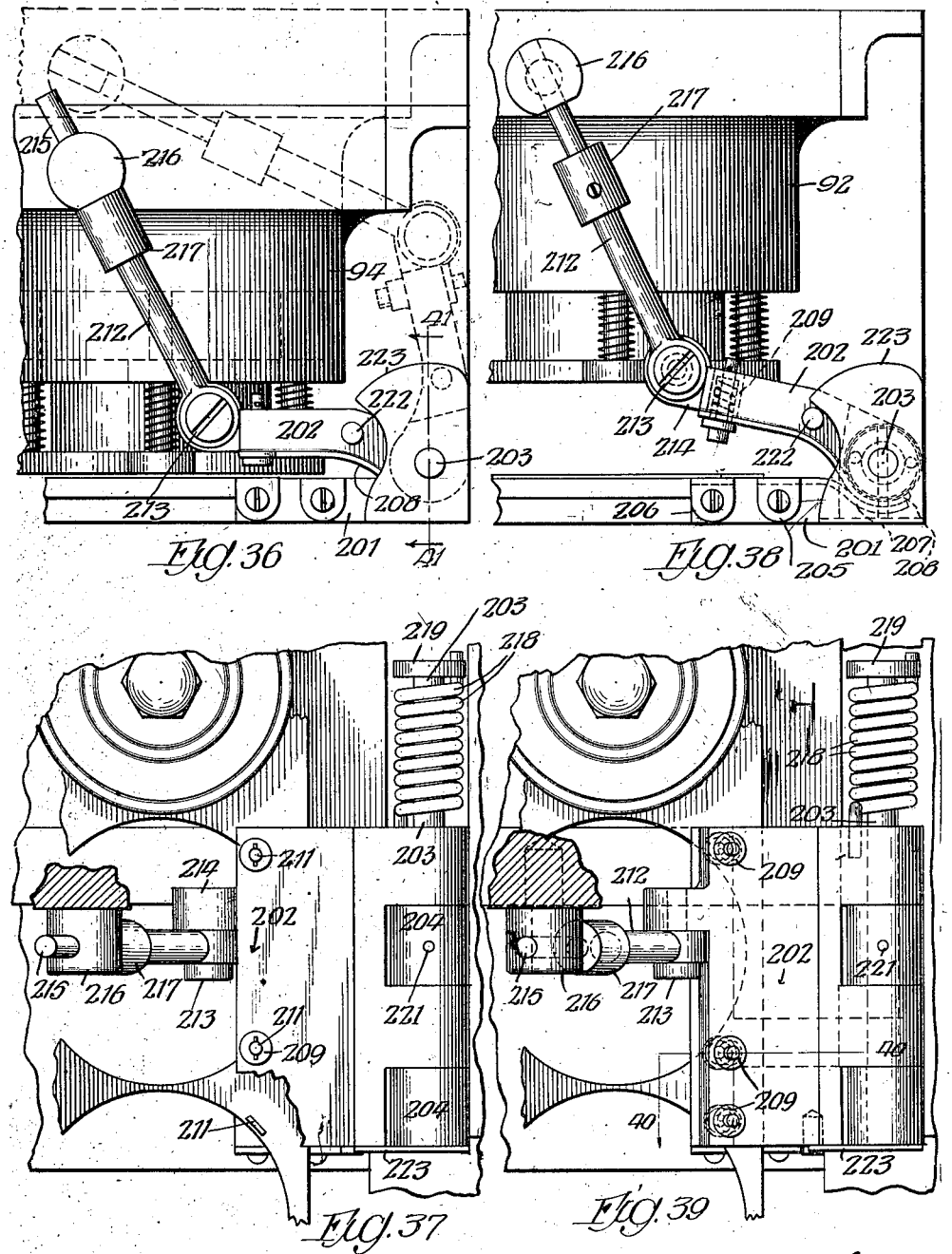

Mar. 6, 1923.  
C. W. GRAHAM  
AUTOMATIC MACHINE FOR CUTTING PAPER GASKETS  
Filed Apr. 22, 1918    16 sheets-sheet 16
1,447,381
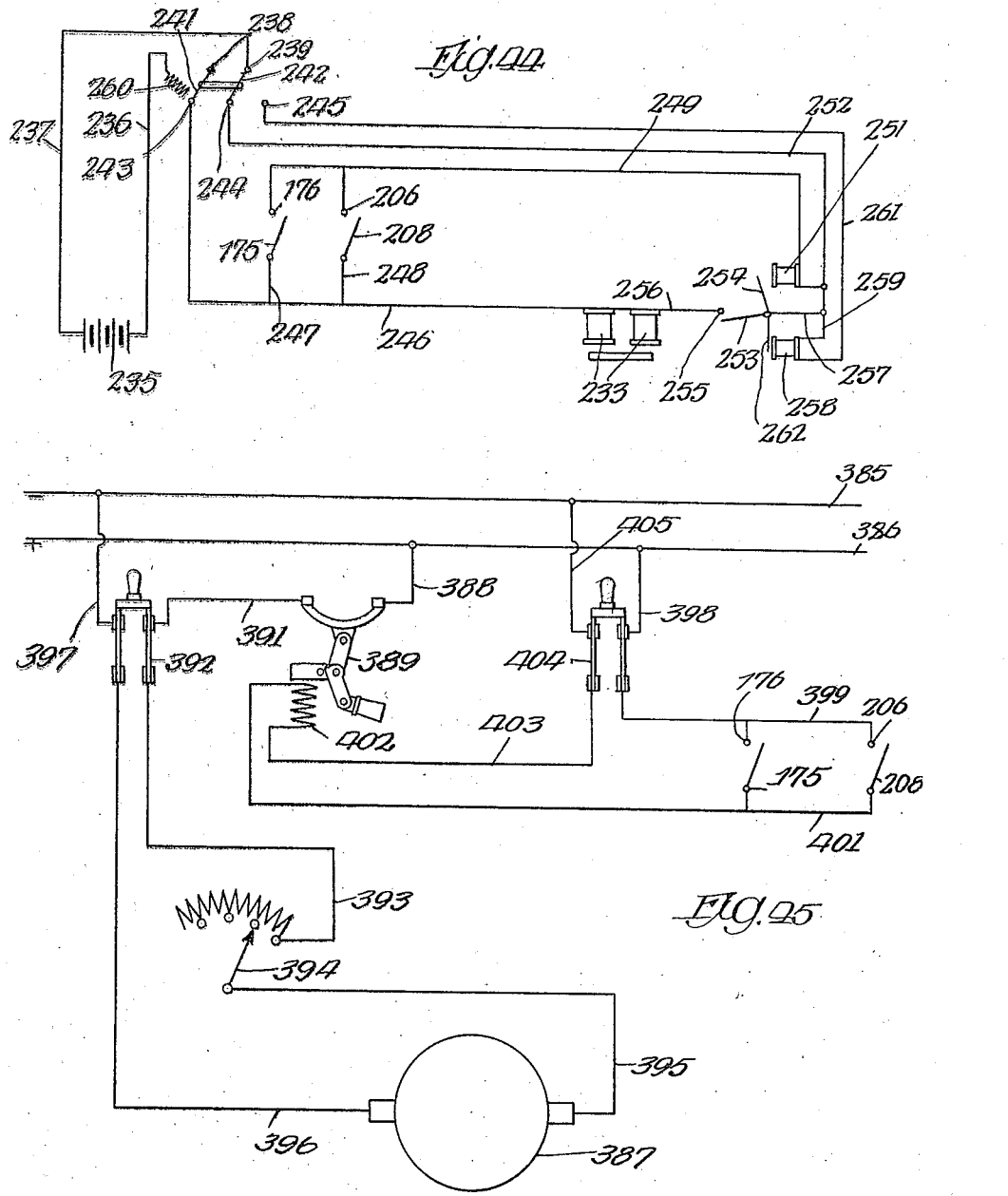

Patented Mar. 6, 1923.

1,447,381

UNITED STATES PATENT OFFICE.

CHARLES W. GRAHAM, OF ALLENDALE, NEW JERSEY, ASSIGNOR TO AMERICAN CAN COMPANY, OF NEW YORK, N. Y., A CORPORATION OF NEW JERSEY.

AUTOMATIC MACHINE FOR CUTTING PAPER GASKETS.

Application filed April 22, 1918. Serial No. 229,952.

*To all whom it may concern:*

Be it known that I, CHARLES W. GRAHAM, a citizen of the United States, residing in Allendale, in the county of Bergen and State of New Jersey, have invented a new and useful Improvement in Automatic Machines for Cutting Paper Gaskets, of which the following is a specification.

This invention relates to a machine for automatically cutting can end gaskets or liners and core disks from web material and stacking the same for storage or subsequent handling.

A principal object of the present invention is the provision of a machine which will rapidly and accurately cut the cores or centers and the gaskets or liners from a roll of web material and arrange said gaskets and cores or centers to permit safe and easy subsequent handling and storing and also feeding in other machines adapted to operate upon the gaskets to place them in the can ends or on the cores to cut from them gaskets of smaller size. The gaskets as cut are rings of relatively large diameter and small width and consequently extremely frail and the invention contemplates the arrangement of such gaskets or liners in a stack formation sufficiently compact to enable the gaskets to present a solid outer surface of substantially the strength of a tube of thickness equal to the width of the gasket, so that each gasket is able to resist tearing with the accumulative strength of a large number of gaskets upon each side of it.

A further object of the invention is the provision of a machine of this character which will insure the provision in said stacks of only liners of perfect formation, so that the usable number of gaskets in the stack is equal to the entire number of gaskets therein contained.

A further object of the invention is the provision of a gasket lining machine to which a counter and recording device may be attached to count and record the number of gaskets cut, the operation of the machine being sufficiently accurate to justify reliance upon the data furnished by said counting and recording device.

Another and highly important object of the invention is the provision of a feed of substantial and complete accuracy thereby insuring accuracy of the entire apparatus and a uniform product.

A further object of the invention is the provision of an apparatus of the character described which will not require the continuous attention of an attendant, the construction being such that he need only replace the filled stacks with empty ones, and such also that he need not watch the operation of the machine to insure substantially perfect production, means being provided to cause stoppage of the machine should the parts work imperfectly.

A still further object of the invention is the provision of a machine of relatively simple and economic construction, ready adjustment and prolonged and enduring efficiency.

Other objects and advantages of the invention will be apparent as it is better understood from the following description when considered in connection with the accompanying drawing illustrating a preferred embodiment thereof.

On the drawings,

Figure 1 is a front elevation of a machine embodying my present invention;

Fig. 2 is an end elevation looking from the left in Fig. 1;

Fig. 3 is an end elevation looking from the right in Fig. 1;

Fig. 4 is a slightly enlarged top plan view of the machine shown in Fig. 1;

Fig. 5 is a horizontal section taken substantially on the line 5—5 of Fig. 1;

Fig. 6 is a similar section on the line 6—6 of Fig. 10;

Fig. 7 is a section taken substantially on the line 7—7 of Fig. 1;

Fig. 8 is a similar section taken substantially on the line 8—8 of Fig. 1;

Fig. 9 is a vertical section on the line 9—9 of Fig. 10;

Fig. 10 is a partial vertical section on the line 10—10 of Fig. 1;

Fig. 11 is a similar section upon the line 11—11 of Fig. 1;

Fig. 12 is an enlarged vertical section on the line 12—12 of Fig. 1;

Fig. 13 is a partial enlarged irregular section on the line 13—13 of Fig. 1;

Figures 27, 28:
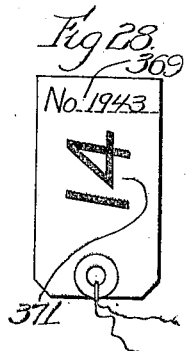

Figs. 14, 14ª and 14ᵇ are enlarged detail views showing different positions of the paper feeding and tripping mechanism and taken on the line 14—14 in Fig. 13;

Fig. 15 is a partial section of the operating parts of the pin clutch and taken on the same vertical plane as the right hand upper part of Fig. 9, and on a larger scale;

Fig. 16 is a partial vertical section taken on the line 16—16 of Fig. 4;

Fig. 17 is a partial section through the connection between the paper or web feeding lever and its vertically moving and controlling operating rod;

Fig. 18 is a plan view of a gasket stack or holder;

Fig. 19 is a section through the same on the line 19—19 of Fig. 18;

Fig. 20 is a plan view of a stack or holder for the cores or centers formed in making the gaskets;

Fig. 21 is a vertical section through the same on the line 21—21 of Fig. 20;

Fig. 22 is a perspective view of a gasket;

Fig. 23 is a perspective view of a core or center;

Fig. 24 is a top plan view of a truck for carrying said stacks for the gaskets and for the cores or centers;

Fig. 25 is a side elevation of the same;

Fig. 26 is an end view of such truck;

Fig. 27 is a full size view of a record from the recording counters of the number of gaskets provided by the machine and in the various stacks;

Fig. 28 is a view of a tag for attachment to the filled stacks;

Fig. 29 is a partial vertical section on the line 29—29 of Fig. 10;

Fig. 30 is a similar view and showing certain parts in different positions;

Fig. 31 is a partial section on the line 31—31 of Fig. 29;

Fig. 32 is a view similar to 31 showing certain parts in different positions;

Fig. 33 is a partial vertical section on the line 33—33 of Fig. 29;

Fig. 34 is a similar view showing certain parts in different positions;

Fig. 35 is a partial section taken on the line 35—35 of Fig. 4;

Fig. 36 is a partial elevation of the electric contact operating means;

Fig. 37 is a plan view of the parts shown of Fig. 36, parts being arranged as shown in full lines in the last mentioned figure;

Fig. 38 is a view similar to Fig. 36 with certain parts in different position;

Fig. 39 is a view similar to Fig. 37 showing the parts in the positions in Fig. 38;

Fig. 40 is a vertical section through the hinged detector parts on the line 40—40 of Fig. 39;

Fig. 41 is a vertical section through said parts on the line 41—41 of Fig. 40;

Fig. 42 is a vertical section on the line 42—42 of Fig. 43 and Fig. 12;

Fig. 43 is a section substantially on the line 43—43 of Fig. 42;

Fig. 44 is a diagrammatic view of the wiring for the various electric circuits including the detector switches and lifting magnet;

Fig. 45 is a diagram of the electric wiring and arrangement of apparatus provided to co-operate with the detector to stop the motor;

Fig. 46 is a horizontal section taken substantially on the line 46—46 of Fig. 48.

Fig. 47 is a top plan view of a liner carrying stack holder; and

Fig. 48 is a side view thereof partly in elevation and partly in section.

For the purpose of illustrating my invention I have shown on the drawing a machine or apparatus in which its several features are embodied. It will be manifest, however, as the invention is better understood that the structure shown is merely for the purposes of illustration and subject to material modification without departing from the spirit of the invention.

Referring to the embodiment of the invention shown on the drawing in detail reference characters 75 indicates a main frame of any suitable or preferred construction adapted to carrying the operating parts of the device, being shown in the present instance as consisting of a sub-base 76 upon legs 77 and an upper head 78 supported upon uprights 79 from the sub-base. Two bearing arms or brackets 81 and 82 extend up from bed 78 and provide bearings 83 and 84 for a main driving shaft 86 having a pulley 87 adapted to actuate all of the driven instrumentalities in the machine. The shaft 86 is provided with a crank portion between the bearings 83 and 84 which, through a connecting arm or rod 88, imparts reciprocation to a die carrying head 89 slidable in ways 91 of the character frequently provided in die and punch presses.

Referring more particularly to Figs. 10 and 11, it will be noted that the head 89 is provided with a die carrying member 92 in which are mounted two dies 93 and 94 arranged in alignment from the front to the back of the machine, the front die 93 cutting out the core centers 95 and the back die 94 cutting out the annular gaskets 96, all as will be hereinafter more fully described. The two dies 93 and 94 co-operate with a fixed female die 97 having die apertures 98 and 99 appropriately positioned to receive the dies 93 and 94 in the operation of the apparatus, is being understood that the gaskets and cores or centers in the present instance are cut from paper or other suitable material interposed above the die 97 and beneath the dies 93 and 94. The die 97 is a fixed die and is held upon the bed above apertures extending through the bed in any suitable fashion in registration with the apertures in the die. The dies 93 and 94 are fixed in the die carrying member 92 and a stripper plate 101 is provided and has apertures through which these dies may project in their cutting operation, retraction of the head 89 and die carrying member causing the dies to pass upwardly through the stripper plate prevents the web following the dies on their upper stroke.

The stripper plate 101 is secured to the end of a plurality of rods 102 positioned through the die carrying member and having heads 103 at the upper side of said member, the lower ends of these rods being threadedly engaged with a stripping plate. Springs 104 embrace the ends of the rods between the stripping plate and the lower face of the die carrying member so that during the initial upward movement of the head the stripper plate presses down upon the web material and prevents it following the dies. The die 94 is provided with a yielding plunger 105 having a stem 106 extending through the die 94 and surrounded by a spring 107 disposed between the plunger head and the die itself to press the plunger downwardly away from the die. When the die descends a pilot 108 enters into the bore 109 in a stack holder 111 to center the holder and permit the threading over it of the liner after it is cut. This construction will be more fully hereinafter explained.

The gasket lining material in the present instance is provided from a strip of suitable material which for certain purposes of this invention may be considered to be continuous. This strip is provided in the form of a roll 112 positioned upon a roll holding shaft 113, reference being had in this connection more particularly to Figs. 3 to 5 and 10 and 11. The shaft 113 is provided with end pins 114 which rest in brackets 115 extending out at the front of the machine. The web of paper indicated at 116 passes from the roll 112 between a pair of rolls, indicated respectively at 117 and 118, located just above the roll 112 and at the front of the machine. From the rolls 117 and 118 the web extends between the dies performing the cutting operations just described and thence between a pair of rolls 119 and 121 at the back of the machine, all of which rolls 117 to 121 are power driven and actuated intermittently to advance the paper after each cutting operation.

The rolls 117 to 121 inclusive are provided with outwardly extending studs 122 at each end, which studs are housed in suitable bearings or brackets 123 extending out from the frame. In the present instance the studs of the lower rolls 118 and 121 rest in fixed bearings and the studs of the upper rolls 117 and 119 are engaged in bearing blocks 124 in such brackets, said blocks feeling the pressure of springs 125 interposed between the blocks and adjusting screws 126 which may be screwed up or down through the tops of the brackets to vary the pressure of the rolls against each other and upon the paper. The two rolls of each pair are geared together by suitable connecting gears 127 and at the left hand side of the machine the shafts 122 of the two lower rolls are provided with sprocket wheels 128 connected by a sprocket chain 129 so that all of the rolls through this sprocket connection and through the gear connections move together. Motion is imparted to these rolls by a ratchet drive connection at the right hand end of lower front feed roll 118.

Referring more particularly now to Figs. 3, 4, 13 and 16, it will be noted that a ratchet wheel 131 is fast on the end of the roll shaft 122, adapted to be engaged by a pawl 132 on one arm of a rocking bell crank 133 loose on said shaft 122. The other arm of this bell crank is connected by a link 134 with the free end of a lever 135 pivoted at 136 in a bearing arm 137 extending up from the bed 78 of the machine.

The lever 135 is pivotally connected midway its ends with a vertically reciprocating rod or bar 138 having a bearing in an aperture 139 in the bed and connected at its upper end in a head 141 pivotally secured to an end of a bell crank lever 142 having a bearing or pivotal shaft 143 carried in a bearing hub or support 144 carried at the upper end of an upright housing 145 extending up at the right of the machine (Figs. 1, 3 and 4). The arm of the bell crank 142 connected with the head 141 is provided with a roller 146 located above the shaft 86, which roller engages a cam 147 fast on the shaft 86. A spring 148 is interposed between the free end of the other arm of the bell crank 142 and an arm 149 extending out from a shaft 151, said spring serving to cause the roller 146 to follow the cam in its movement and actuate the feeding device, the purpose of the arm 149 and its attendant mechanism will be later hereinafter more fully explained.

At each rotation of the crank shaft 86, the two dies are operated, the one to cut a core or center and the other to cut a liner from a portion of the web from which the core or center has already been removed, and when the punches have been lifted above the paper the ratchet mechanism, as just described, through reciprocation of the bar 138 causes the paper to be fed forward a unit length; that is to say, the distance between the die centers positioning the portion from which the core is cut accurately beneath the rear die and bringing a new portion of paper beneath the forward die for the next descent of the dies.

It is intended that the machine embodying my present invention shall only operate while and at such times as the paper is feeding properly in order that only perfectly formed gaskets may be provided. To this end a system of safety devices or detectors are provided to halt the paper feed should the paper become torn in the machine or should the machine for some other reason fail to feed properly. The first of these devices is controlled by the paper as it leaves the feed rolls 117 and 118 at the front of the machine. Just inwardly of these rolls are provided a pair of paper web engaging rolls 152 and 153 (Figs. 10, 11, 29 and 30). The roll 152 is freely rotatable and constitutes a supporting roll beneath the web of paper. It is provided with bearing pin 154 mounted in suitable bearings 156. The roll 153 is fixed upon a shaft 157 rotatably supported at its ends in a swinging frame 158 pivoted at 159 in a bearing bracket 160 extending up from the bed of the machine.

The two rolls are provided with pinions 161, 162 of diameter equal to the diameter of the respective rolls and adapted to intermesh when the frame is moved down to the horizontal position shown in Fig. 29, the roll 153 in such position resting upon the roll 152 or rather upon the paper web which passes between them. The roll 153 may be termed a measuring roll and through attendant mechanism about to be described causes a stoppage of the feeding device should paper cease to pass between it and the roll 152 or should insufficient paper pass between these rolls at a single feeding action. The two rolls 152 and 153 are rotated by frictional contact with the paper itself.

The shaft 157 is provided at its end adjacent the pivotal axis 159 with a wheel 163 (Figs. 5, 29, 30, 33 and 34) having a peripheral flange or web 164 extending out at the side and away from the roll 153. This web is provided with a transverse slot 165 at one point, said slot being of tapering form and wider at the inner side than at the outer side of the web. The slot 165 is adapted to receive a tapered tooth or lug 166 formed on the end of the arm 167 of a lever 168. The lever 168 is fulcrumed upon a short shaft 169 mounted in suitable bearings 171 in the bed. The lever 168 extends toward the left of the machine and the arm 167 out at right angles to the body and toward the front. The tooth or lug 166 is adapted to either pass down into the tapered slot 165 and against the bed 78 of the machine or to ride upon the inner surface of the flange 164 of the wheel 163. The wheel 163 and the roll 153 make a complete revolution at each proper feeding of the paper web and at the end and beginning of said revolution it is intended that the tooth 166 will rest in the recess or tapered slot 165. The lever is guided in its movement by a rectangular portion 172 located just rearwardly of the tapered tooth, said rectangular portion moving between guides 173 and 174 insuring a proper accurate movement of the tapered tooth. It is intended that the descent of the crosshead with the punches or dies will complete an electric circuit preventing the feeding of the paper if the tapered tooth 166 does not move down into the slot, which circuit will be hereinafter more fully described. This circuit, however, contains contacts kept open so long as the paper is feeding properly and closed if the tooth 166 has not entered the tapered slot when the punch should operate.

These contacts consist of two conductor bars 175 and 176 mounted upon an insulating backing 177 supported by an upwardly extending bearing support 178 (Figs. 31, 32). A contact 179 slidable over contact 176 is mounted on lever 168, said contact 179 being always electrically connected with contact 176 and being otherwise insulated through suitable insulation. Another contact 181 always engaging contact 175 is mounted upon the end of a pin or rod 182 carried in an insulating housing 183 fixed on a vertical movable rod 184, said rod having a bearing in an outwardly extending end 185 of the bearing support 178 and connected at its lower end with a pin and slot connection 186 (Fig. 29) with the lever 168, the shoulder pin or screw 188 extending through the slot permitting a play between these parts as will be later described, whether the tooth 166 of the lever 168 moves into the slot 165 or not.

A spring 189 is interposed between the arm 185 of the bearing support and a collar 191 fixed on the rod, which spring normally holds the rod and lever in elevated position. Viewing Figs. 29 and 30 it will be noted that an arm 192 extends out from the crosshead and has a sliding fit over the end of the rod 184. Downward movement of the crosshead causes this arm 192 to engage the collar 191 and move it down as the crosshead reaches the lower end of its stroke at which time the paper feeding apparatus should be stationary. If the lever cannot move down with the tooth 166 passing into the tapered slot, the contact 179 is in position to be engaged by head 193 on the end of the pin or rod 182, which engagement locks the feeding mechanism against further action as will be later described. A spring 194 engages the lever 168 and the insulating block 183 to keep these members apart except at such times as the tooth cannot enter the slot 165. A spring 195 is also positioned back of the head 193 of the pin 182 to keep this pin in its normal position as shown in Fig. 31.

A further safety device is provided to prevent feeding of the paper should the punches or dies act improperly or should the paper become torn after leaving the punches or dies and before passing the feed rolls at the rear. It will be understood that all four rolls, i. e. the two at the front and the two at the rear, act as feeding rolls. The two forward rolls introduce the web into the machine and the two rolls at the rear maintain a desired tension and remove the waste.

The mechanism about to be described for causing stoppage of the feeding rolls should the web be torn or improperly cut, includes other contacts in the same electric system, said contacts being kept open during normal, proper action and closing when conditions become undesirable.

The mechanism controlling these contacts and other controlling mechanism is located just rearwardly of the punches, reference being had in this connection to Figs. 4, 5, 36 to 41. Two members of insulating material 201 and 202 are hinged together (Fig. 36) by a shaft or pintle 203 disposed alongside the path of the paper web and as has been stated beyond the punches upon the portion of the web that has had the gaskets cut therefrom. The insulating member 201 is mounted upon the bed of the machine and its lugs 204 (Fig. 37) embrace the shaft 203 and form the fixed portion of the hinge. Two contact bars 205 and 206 (Fig. 40) are mounted upon the upper face of the lower or fixed insulating block 201, one being located at the front and the other at the rear. The one at the rear 205 is provided with a rearwardly extending lug 207 which contacts with a contact plate 208 on the underface of the upper insulating block in all positions of these parts. At the front the swinging or upper block 202 is provided with three sockets 209 (Fig. 39) attached to plate 208, in which are movable plungers 211 adapted when the block is moved downwardly to engage the contact bar 206 when no paper is present to form insulation.

Viewing Figs. 37 and 39, it will be noted that the three sockets 209 and plungers 211 are so arranged as to engage the waste portion of the web of paper close to the spaces or perforations provided in forming the gaskets so that if the gaskets are properly formed and the paper is feeding properly contact will be prevented but if the paper is torn or misplaced or improperly advanced contact will be made and the circuit established, it being understood that the block 202 moves up and down at each punch operation. This movement is accomplished by a rod 212 (Figs. 36, 38) pivotally connected at 213 with a lug 214 extending out from the end of the block 202. One end 215 of this rod is disposed through a swivel socket 216 fast to an appropriate part of the vertical reciprocating crosshead or die carrier. The rod carries an adjustable collar 217 fixed upon it and adapted to be engaged by the swivel socket 216 to push the rod down and through the rod the block 202. A spring 218 (Fig. 39) is provided to lift the block 202 when the cross head moves upwardly, this spring embracing an end of the shaft 203 and having one end secured in a collar 219 upon this shaft and the other end engaging in the block 202. A pin 221 is disposed through one of the lugs 204 to prevent rotation of the shaft 203. Upward movement of the block under the influence of the spring continues until an upwardly extending pin 222 (Fig. 38) engages a spring leaf stop 223.

The construction of the detector safety device located both at the front and at the rear of the dies is such that parts of the device may be moved out of the way to permit inspection of the paper. It will be noticed that the swinging frame may be lifted up and out of the way exposing the roll 153 and that the swinging block 202 can be moved out of the way also as indicated in dotted lines in Fig. 36 by causing the pin 222 to pass the yielding stop 223.

The actuation of the feeding rolls is accomplished as has been already described by the ratchet wheel 131, the ratchet pawl 132, the oscillating bell crank 133, the link 134, the rod 138, head 141, lever 142 and roller 146 engaging eccentric 147. Means are provided to halt the action of the rod 138 by lifting the lever 142 to its highest point when any of the contacts just described are electrically closed, with a consequent stoppage of the action of the feeding rolls, which means will now be described.

On the shaft 143 of the bell crank lever 142 is provided a downwardly extending arm 224 (Figs. 3, 4 and 12) mounted to move with said bell crank and with said shaft. This arm is adapted to be engaged by latch bar 225. The latch 225 is pivotally mounted in lugs 226 (Fig. 12) attached to upright housing 145 extending up from the top of the bed at the right. The housing is provided with a shelf 234 beneath which is secured a pair of magnets 233 (Figs. 42 and 43). An armature 229 for these magnets is mounted upon a reciprocating rod 230 yieldably connected at 220 in a housing 231 which forms the upper part of a yoke 240, which yoke is in turn connected with the latch bar 225 at 232, energization of the magnets 233 lifting the armature and through the armature the latch bar. When the circuit already mentioned is completed these magnets are energized and the bar 225 is lifted in position to engage the end of the arm 224, and at the same time a circuit is completed for preventing de-energization of these magnets until the attendant releases the device, the latch bar locking the parts.

The electric circuit for these safety devices is shown diagrammatically in Fig. 44. Referring to this figure reference character 235 indicates any suitable source of electrical energy from which two wires 236 and 237 lead respectively to contacts 238 and 239 of a double leaf switch, the two leaves 241 and 242 of which are adapted to contact either with two contacts 243, 244 or contact 244 and a third contact 245, the leaves being normally, when the machine is operated, in contact with contacts 243 and 244. From the contact 243 a wire 246 connects with the magnets 233. From this wire a connection 247 connects to terminal bar 175 (Fig. 31) and another connection 248 connects with bar 208. A wire 249 connects terminals 176 and 206 with a magnet 251, which magnet is connected by wire 252 with terminal 244. If contact is established either between contacts 175 and 176 or contacts 208 and 206 a circuit is completed from battery through wire 237, switch arm 242, wire 252, magnet 251, wire 249, wire 247 (or 248), wire 246, switch arm 241 and wire 236 to battery, thus energizing magnet 251. This magnet controls movement in one direction of a switch arm 253 by action of its armature 254 rigidly connected to said switch arm. Energization of the magnet and subsequent attraction of the armature moves the switch arm 253 into contact with the terminal 255 thereby completing the circuit through magnets 233. This circuit comprises wire 236, switch arm 241, wire 246, two magnets 233, wire 256 from magnets 233 to terminal 255, switch 253 and wire 257 to wire 252 and back to battery by wire 252, switch arm 242 and wire 237, which circuit is independent of the continued engagement of contacts 175 and 176 or contacts 208 or 206.

Consideration of these last mentioned contacts and their attendant parts will disclose the fact that these contacts are only momentarily in engagement since the parts controlling them reciprocate with the crosshead, and the circuit for the magnets 233 is established and maintained halting the feeding device until the circuit is broken by the attendant, which should occur after he has corrected the causes for the stoppage. Should he not correct such causes, however, the next feeding action will again result in locking the machine. The normal conditions are re-established by the attendant moving the double bar switch over into contact with terminals 244 and 245 establishing thereby a circuit through a magnet 258 as follows: wire 236 from battery to switch bar 241, wire 252, wire 259 connecting wire 252 with magnet 258, wire 261 leading from magnet 258 to terminal 245, switch bar 242 and wire 237 to battery. Energization of the magnet 258 attracts the armature 262, which is made one part with the armature 254 of magnet 251 and switch blade 253 controlled thereby; since this manual manipulation of the double blade switch breaks the contact previously established with terminal 243 magnets 233 are no longer energized and magnet 258 through the movement of its armature opens the switch 253 permitting dropping of the latch bar 225 and permitting the continuation of the feed. During this stoppage the crosshead and the dies move idly up and down without action upon the paper web. The switches 241, 242 may now be returned to normal position either by the operator or by a spring 260.

It is intended that the cores or centers and the gaskets shall be fed as formed into stacks in stack holders and as each stack holder is filled that an empty one will be automatically positioned to receive a charge.

The stack holders are mounted in the machine upon suitable carriers and are successively presented empty to the dies to receive the cores and liners and remain there until the holders are filled, when the cutting of the gaskets is automatically suspended and the filled stacks withdrawn and new empty ones replaced and the cutting of the gaskets, filling of the stacks automatically continued. While the machine is cutting, a stack holder for the cores or centers is disposed beneath the center cutting die 93, and a stack holder or container for the gaskets is positioned in line with the gasket cutting die 94. In the present instance each stack for holding the cores comprises a base 272 (Fig. 10) adapted to fit over a stud 273 upon a turret 274. A number of rods 275 extend up from the base 272 and are connected together by an annular top 276 through which the cores may gravitate under the action of the dies. A weight 277 is positioned between the rods 275 to press the cores out of the holder when the stack is inverted. Each core or center stack is positioned beneath the opening 98 in the die 97 when it is to receive cores or centers.

Each stack holder for the gaskets (Figs. 10, 18 and 19) comprises a tube 278 of external diameter, preferably accurately equal to the internal diameter of the gaskets and having an outwardly extending rib or flange 279 upon which rests a spacing member or removable collar 281. Resting upon this collar 281 when the stack is in the machine is a weight 282 in the form of a ring. The stack holders 111 are threaded over a supporting cylinder 283 carried upon a post 284 from the turret 274 (Fig. 10). The cylinder 283 is provided with an outwardly extending flange 285 at the bottom against which the lower end of the stack holder rests, the stack holder being locked in place by any suitable mechanism, a split collar 286 being shown on the drawings for the purpose. The stack holder at the top is provided with a collar 287 having an inner edge adapted to fit nicely the upper edge of the cylinder 283 and adapted itself to receive the guiding portion 108 of the plunger 105 in the die or punch 94. The stack is normally maintained in elevated position with its top edge flush with the top edge of the die 97 and this is accomplished by a spring 288 embracing a reduced portion 289 of the rod or post 284 and bearing against the larger bottom portion of this post and against an inwardly extending shoulder or rib 291 fitting closely the upper end of the reduced portion 289, a bolt 292 passing through a collar 293 and into the end of the post 284 to restrain and limit this upward movement.

The turret 274 (Figs. 6 and 7) is constructed in the present instance to receive four pairs of stack holders, each pair consisting of the stack holder for the cores or centers and a stack holder for the gasket liners, the holders being arranged to come successively into accurate registration with the dies as preceding pairs are successively filled, the turret being given a one-quarter revolution to bring the just filled stack holders out of position and the next succeeding empty stack holders into position.

The stack holders for the gaskets are adapted to be inserted and locked in position when they arrive at a station indicated at 294 (Fig. 6), the frame of the machine being carried inwardly at 295 to permit the gasket stack holders to be lifted out. At the same time the companion stack holder for the core may be removed by merely lifting it up beneath the bed of the apparatus. This stack holder terminates beneath the die 97 a substantial distance and a perforated boss 296 (Figs. 6 and 10) to guide the cores or centers accurately into the stack. When the gasket liner stacks are removed or inserted the sleeve or cylinder 283 has been moved down from the position shown in Fig. 9 to a position similar to that shown in Fig. 11 and is held in this position until the spring is permitted to lift it at the gasket forming station.

The mechanism for controlling the vertical movement of the gasket stack holders and the positioning and withdrawal of the stack holders at the dies or punches will now be described, reference being had particularly to Figs. 1 to 17 inclusive. A stub shaft 301 is mounted in the housing 145 and in line with the crank or main power shaft 86. Upon this shaft is provided a gear or pinion 302 closely adjacent the eccentric 147 already mentioned. This gear is the first member of a train of mechanism adapted to be actuated from the main power shaft through a clutch slide bar 303 (Fig. 15) movable in the gear or pinion 302 and parallel to its axis and a fixed pin 304 extending out toward the pinion from the cam 147. A clutch lever 305 fast on shaft 151 (already mentioned) and adapted to enter into a groove 306 in the hub of the pinion 302 and to engage in a slot 307 in the clutch slide bar 303. This clutch lever is pushed upwardly (Fig. 13) by spring 148 which as has been stated engages arm 149 fast also on the shaft 151, the lever 305 when in elevated position maintaining the clutch slide bar 303 in the inoperative position shown in Fig. 15. The portion of the lever 305 which is adapted to enter the slot 307 is bevelled or wedge-shaped and the right hand wall of the slot in the slide bar is engaged by this portion at the proper time to retract the slide bar and disconnect the train of mechanism from the shaft 86. The filling of the liner carrying stacks is intended to result in the actuation of this clutch lever to connect the stack advancing mechanism with the power of the apparatus. This connection is made by the pressure of the die 94 upon the top of a column of liners and, when such pressure is sufficient, to depress the stack holder and the sleeve or cylinder 278.

Viewing Fig. 9 it will be noted that a bell crank lever 308 is pivoted at 309 in a bracket 311 depending from the underside of the bed. One arm 312 of this bell crank lever is disposed horizontally and over a bearing part 310 of the flange 283 and a rod 313 hangs down from said arm and rests upon said part when the stack holder is in the position shown in Fig. 9. The other end of this bell crank lever extends through a slot 314 in the bed and is bifurcated or slotted at 315. A second bell crank lever 316 is pivoted upon the top of the bed (Fig. 4) at 317. One arm 318 of this bell crank lever is embraced by the slotted or bifurcated arm of the lever 308. The other arm is disposed adjacent the rod 138 for actuating the feed and this rod is provided with a slot 319 (Fig. 13). When the stack holder is pushed down by the pressure of the die or punch 94 the bell crank 308 moves in a counter-clockwise direction by gravity (viewing Fig. 9) and moves the bell crank 316 in a similar direction (viewing Fig. 5) until this end engages the rod 138. As soon as this rod reaches its highest point and is about to start its idle movement, the end of the bell crank 316 enters the slot 319 and prevents further downward movement.

The rod 138 is suitably connected in the head 141 as may be seen in Figs. 14, 14ª, and 14ᵇ. A collar 321 is fast on the rod or bar 138 below the head and a spring 322 is positioned between this collar and the head. Head 141 is hollow and slidably embraces an enlarged end 323 of the rod, which end is provided at one side with rack teeth 324. These rack teeth engage teeth 325 of a mutilated pinion 326 pivoted at 327 to extend through the head 141 and having a tail 328 adapted to engage a stud 329 upon the end of the lever 305. When the rod 138 is halted by the lever 316 the downward movement of the head continues and causes a rotation of the mutilated gear 326 in a clockwise direction bringing the tail 328 down upon the stud 329 and lowering the lever 305 to release the clutch slide bar 303 projecting said clutch slide bar in the path of movement of the pin 304 extending out from the cam 147. This results in an actuation of the pinion 302.

The pinion 302 drives a mechanism which first retracts or lowers the stack holder carrying cylinder and then rotates the turret 274 to bring a new pair or set of stack holders into operative position, thereafter permitting the spring 288 of the stack holder carrier to lift the empty stack holder into position to receive the gaskets.

This mechanism comprises a gear 331 (Fig. 13) upon a stub shaft 332 in bearing support 145 and meshing with pinion 302. A mitre or bevel gear 333 is fixed upon the hub of gear 331 and turns with said gear. The mitre or bevel gear 333 is in continuous mesh with a similar gear 334 upon the end of a vertical shaft 335 (Fig. 9), which shaft is journaled at 336 and 337 in the bed and base. Upon the lower end of the shaft 337 is fixed a cam 338 having a peripheral channel 339 in which is engaged a roller 341 pivotally mounted in a collar 342. The collar 342 is fastened upon the end of a hook rod 343, which hook rod is adapted to be disposed over a roller 344 carried in bearing portion 310 of the holder support 283. It will be noted that when in normal position, i. e., the position shown in Fig. 9, the hook rod 343 is in elevated position and upon downward movement is adapted to draw down the stack holder carrier 283 withdrawing it from the bed. The collar 342 is restrained from angular movement by a stud 345 positioned through it.

After the stack holder has been drawn to the bottom of its travel, i. e., against the turret 274, the turret is caused to rotate through a one-quarter turn. This rotation is caused by a Geneva movement illustrated more particularly in Fig. 8 from which it will be noted that a driving Geneva gear 346 is fast upon the shaft 335 and engages a four-movement co-operating Geneva gear 347 formed upon the bottom of the turret. During this advance of the turret the roller 344, which has been lowered by the hook rod 343 engaged under a flange 348, which prevents upward movement of the gasket stack holder carrier after the roller has passed from the influence of the hook rod. A spline 340 is provided to prevent angular movement of the holder support on the post 284. After the Geneva movement is completed the hook rod is again lifted by the cam 338 and the empty holder, which has arrived at the gasket receiving station, permitted to be lifted by a spring in the carrier.

The ratio of the pinion 302 to the gear 331 is 1 to 2 so that the pinion makes two revolutions during this stack replacement action, during which time the dies or punches play idly up and down through the apertures they have previously made in the paper web. The rod 138 will remain locked until a new and empty stack holder is brought up into operative position moving lever 308 to its normal position as shown in Fig. 9 and through the movement of this lever moving lever 316 to release feed roll controlling bar or rod 138.

The member 328 which has actuated the lever 305 to permit engagement of the clutch slide bar 303 with the pin 204 of the cam oscillates in accordance with the movement of the crosshead while the bar 138 is locked and a separate device is provided to retain the lever 305 depressed until the stack holder replacing action is completed. This device consists of an arcuate member 349 on the face of gear 331 adjacent the lever (Fig. 13) and a pin or projection 351 extending out from the lever in position to engage within the rib 349 when the lever is depressed, said rib 349 serving to hold the lever against return movement in the action of the spring 148 during nearly three-quarters of a revolution of the gear 331, insuring two complete revolutions of the crank shaft during the action of replacing the filled stack holder with an empty one.

The apparatus embodying my present invention, and just described, is provided with a counting and recording device for making record of the number of gaskets in each gasket stack holder and also of the number of gaskets out during a run of the machine and the number of stack holders filled. This recording device is shown more particularly in Figs. 1, 3 and 12. The construction of the adding and recording parts of this device is unimportant for the purposes of the present invention, it being only necessary that a roll of paper 353 (indicated in Fig. 1) be printed upon in a suitable housing 354 and advanced as each stack holder is filled. A printing and counting mechanism is provided in said housing and is adapted to be actuated by a rod 355 secured at one end to the recording device and at the other to lug or ear 321 fast on feed control rod 138 so that this rod will reciprocate at each feeding of the gasket material. Another rod 356 is connected with the end of lever 305 which receives an actuation as has been stated at each replacement of the stacks. The counting mechanism preferably actuates three sets of number wheels, one set being progressively operated by the rod 356 and the numbers of stacks—that is 1, 2, 3 and 4—as indicated at 357 in Fig. 27, showing the printing strip 353; the second set of printing wheels indicates the number of gaskets in each stack as indicated at 358 in Fig. 27; and the third set indicates the total number of gaskets in the stacks completely filled at any time of the run, such numbers being indicated at 359. A printing operation is made each time a gasket stack holder is replaced, the totals printed in the columns 357 and 359 being accumulative and the counts indicated in columns 358 being renewed after each operation.

The devices earlier described for insuring accuracy of feed, insure also accuracy of the printed information on the strip 353, since improper feeding prevents the formation of gaskets.

In operating the machine it is intended that a truck (shown more particularly in Figs. 24 to 26) be provided to supply the empty stacks and to receive the filled ones. The truck in the present instance comprises a bed 361 mounted upon suitable wheels 362 and divided into two parts 363 and 364, one part 363 being adapted to carry the gasket stack holders and the other part 364 to carry the core stack holders, each either filled or empty. The part 363 is provided with a number of upwardly extending posts 365 from which the filled and empty stack holders may be positioned and the part 364 is provided with an upper perforated plate 366 having the perforations 367 which are adapted to receive the core or center carrying stacks. The truck is preferably filled with empty stack holders of both kinds and run up alongside the machine. As the empty stacks are inserted by the attendant in place of filled ones, the filled ones are placed in the truck and holders for the stacks on the truck are preferably numbered to correspond with the numbering of the printed strip already described. (As indicated by numerals 368 in Fig. 24.) Or if desired a ticket or tag, as indicated in Fig. 28, may be provided and attached to each stack as formed and a space indicated at 369 being provided to receive the number of core pieces or gaskets in the stack and the tag bears also numerals as indicated at 371 giving to the stack the number indicated at the printing machine.

When the core and gasket stacks are removed they are arranged for use in a machine or apparatus adapted to receive them and feed the individual piece from the stack as they are needed in the operation of the machine. The spacing member 281 is removed and the gaskets moved down to permit a holding collar 372 (Fig. 19) to be inserted over the end of the stack holder to hold the gaskets in place and compress them tightly against the weight 282 so that the gaskets present a hard outer surface formed of their several edges to resist any damage in handling. The cores are held in their stack by inserting a block 373 of wood or other material between the topmost core or center and the upper ring 276. If desired means may be provided to cause the machine to become completely idle at each locking of the feed. Assuming that the machine is actuated in the present instance by an electric motor, I provide mechanism for shutting off the current to such motor upon interruption of the feeding. The wiring for this is indicated in Fig. 45 in which reference characters 385 and 386 indicate main leads from any suitable source of current to a motor 387 by way of a wire 388 from opposite line wire 386 to a circuit breaker 389, wire 391 to main throw-out switch 392, wire 393 to starting device 394, wire 395 to motor, wire 396 from motor to other side of switch 392 and wire 397 to negative main line wire 385, a throw-out circuit for controlling the circuit breaker comprising wire 398 from main line wire 386 and wire 399 to terminals 176 and 206, already mentioned as forming parts of the electric connections controlling the paper feed. From terminals 175 and 208 a wire 401 leads to one side of the winding 402 of said circuit breaker and from the other side wire 403 leads to a switch 404 connecting with wire 405 to negative main line wire 385, said switch 404 connecting when closed wires 398 and 399. If either contacts 175, 176 or 208, 206 are closed by improper action of the machine, circuit breaker 389 is thrown open and current ceases to be delivered to motor 387 in addition to stopping the feed as already indicated.

An apparatus for producing similar action when a mechanical, i. e., belt, drive is used, is fully set forth and claimed in an application of George W. Wheelwright for power control mechanism and executed of even date herewith filed Apr. 22, 1918, Ser. No. 230,001.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for forming can end liners or gaskets adapted to be folded into the seam between a can end and can body to form an hermetic seal, the combination of cutting mechanism and stack holder for receiving the gaskets from the cutting mechanism and arranging said liners or gaskets in a compact solid tube formed of the liners, said stack holder being of external diameter equal to the internal diameter of the liners.

2. In a machine for forming can end liners or gaskets adapted to be folded into the seam between a can end and can body to form an hermetic seal, the combination of devices for cutting the liners or gaskets and stack holders arranged to receive the liners or gaskets directly from said cutting device and arranging said liners or gaskets in a compact solid tube formed of the liners, said stack holder being of external diameter equal to the internal diameter of the liners.

3. In a machine for forming can end liners or gaskets adapted to be folded into the seam between a can end and can body to form an hermetic seal, the combination of cutting devices for successively cutting liners from a presented web of material and stack holders accurately fitting the inside of said liners or gaskets and receiving said liners as they are cut.

4. In a machine for forming can end liners or gaskets adapted to be folded into the seam between a can end and can body to form an hermetic seal, the combination of cutting devices for successively cutting liners from a presented web of material and a stack holder accurately fitting the inside of said liners or gaskets and receiving said liners directly from the cutting devices.

5. In a machine for forming can end liners or gaskets adapted to be folded into the seam between a can end and can body to form an hermetic seal, the combination of cutting devices, a stack holder for receiving the liners as cut in closely compacted formation, said stack holder being movable to liner-receiving position and away from liner-receiving position, and means whereby a predetermined accumulation of stacked liners causes said stack holder to be moved away from receiving position.

6. In a machine for forming can end liners or gaskets adapted to be folded into the seam between a can end and can body to form an hermetic seal, the combination of cutting devices, a stack holder for receiving the liners as cut in closely compacted formation, an element moving with the cutting devices and pressing on a sufficient accumulation of stacked liners and acting to compact such stack of liners, and means whereby the increasing resistance of such stack causes the cessation of the supply of liners thereto.

7. In a machine for forming can end liners or gaskets adapted to be folded into the seam between a can end and can body to form an hermetic seal, the combination of cutting devices for cutting gaskets or liners from a presented web of material and an automatically movable stack holder for receiving said gaskets or liners as they are cut, and means for withdrawing said stack holder from receiving position when a proper number of gaskets have been received thereby, and means operated by an accumulation of gaskets for causing the actuation of said withdrawing means.

8. In a machine for forming can end liners or gaskets adapted to be folded into the seam between a can end and can body to form an hermetic seal, the combination of cutting devices for cutting gaskets or liners from a presented web of material, a plurality of stack holders, a stack holder carrier and actuating devices for presenting said stack holders into receiving position to permit them to successively receive the liners or gaskets cut by said cutting means, an element moving with the cutting devices and pressing on a sufficient accumulation of stacked liners to compact the same, and means whereby predetermined resistance of said stack causes the filled holder to be moved to non-receiving position.

9. A machine for forming can end liners or gaskets adapted to be folded into the seam between a can end and can body to form an hermetic seal, having in combination cutting devices for cutting gaskets or liners from a presented web of material, a plurality of stack holders, a stack holder carrier and actuating devices for presenting said stack holders to receive successively a full charge of liners as they are cut by said cutting devices.

10. In a machine for forming can end liners or gaskets adapted to be folded into the seam between a can end and can body to form an hermetic seal, the combination of cutting devices for cutting gaskets or liners from a presented web of material, stack holders for receiving said gaskets or liners and associated instrumentalities for positioning and withdrawing said stack holders from gasket receiving position, said instrumentalities being governed in their action by the gaskets received by said stack holders.

11. In a machine for forming can end liners or gaskets adapted to be folded into the seam between a can end and can body to form an hermetic seal, the combination of cutting devices for cutting gaskets or liners from a presented web of material, a stack holder for receiving the liners as they are cut, means for moving said stack holder to non-receiving position, means operating with said cutting devices for compacting said stack of cut liners, and devices whereby the resistance of a completed stack to said compacting means causes the operation of said means for moving the stack holder.

12. In a machine for forming can end liners or gaskets adapted to be folded into the seam between a can end and can body to form an hermetic seal, the combination of cutting devices providing a core and an annular ring or gasket from suitable presented web material, and a stack holder for receiving said gaskets as they are cut and means for conveying said stack holder.

13. In a machine for forming can end liners or gaskets adapted to be folded into the seam between a can end and can body to form an hermetic seal, the combination of cuttting devices providing a core and an annular ring or gasket from suitable presented web material, and a stack holder for receiving gaskets directly from said cutting devices as they are cut and means for conveying said stack holder after it is filled to a predetermined height.

14. In a machine for forming can end liners or gaskets adapted to be folded into the seam between a can end and can body to form an hermetic seal, the combination of cutting devices for cutting gaskets or liners from suitable presented web material, and a stack holder co-operating with said cutting devices during cutting operation to receive the liners into stack formation, means for conveying the stack holder, and means moving with said cutting devices and resisted by a completed stack for causing the actuation of said conveying means automatically.

15. In a machine for forming can end liners or gaskets adapted to be folded into the seam between a can end and can body to form an hermetic seal, the combination of means for feeding web material, cutting devices for cutting gaskets or liners from said web material, a stack holder for receiving liners as they are cut, and means actuated by the accumulated liners for automatically removing the stack holder from receiving position after it has received a predetermined quantity of liners.

16. In a machine for forming can end liners or gaskets adapted to be folded into the seam between a can end and can body to form an hermetic seal, the combination of means for feeding web material, cutting devices for cutting gaskets or liners from said web material, a stack holder for receiving liners as they are cut, means for automatically removing the stack holder from receiving position after it has received a predetermined quantity of liners, and means for halting the feeding mechanism until an empty stack holder is positioned.

17. In a machine for forming can end liners or gaskets adapted to be folded into the seam between a can end and can body to form an hermetic seal, the combination of cutting devices for cutting gaskets or liners from presented web material, a stack holder for receiving the gaskets or liners as they are cut, means for conveying the stack holder horizontally, and means for stopping the cutting of liners when said stack holder is full, said stopping means being actuated by accumulated liners.

18. In a machine for forming can end liners or gaskets adapted to be folded into the seam between a can end and can body to form an hermetic seal, the combination of cutting devices for cutting liners or gaskets from presented web material and a stack holder engaging a member of said cutting device, said member acting to positively position said gasket on said holder, and means for conveying the stack holder horizontally, and means actuated by accumulated gaskets for causing the operation of said conveying means.

19. In a machine for forming can end liners or gaskets adapted to be folded into the seam between a can end and can body to form an hermetic seal, the combination of a reciprocating cutting member for cutting a gasket or liner from web material and a stack holder for receiving said gasket, said cutting member serving to cut and position said gasket on a stack holder at a single stroke and having a part which enters within said stack holder.

20. In a machine for forming can end liners or gaskets adapted to be folded into the seam between a can end and can body to form an hermetic seal, the combination of a reciprocating cutting member for cutting a gasket or liner from web material and a stack holder for receiving said gasket, said cutting member serving to cut and position said gasket on a stack holder at a single stroke, and a centering means for bringing said holder and cutting member to accurate registration at each said stroke.

21. In a machine for forming can end liners or gaskets adapted to be folded into the seam between a can end and can body to form an hermetic seal, the combination of means for simultaneously cutting a center or core and a liner or gasket from presented web material, and stack holders for receiving respectively said core or center and said liner or gasket.

22. In a machine for forming can end liners or gaskets adapted to be folded into the seam between a can end and can body to form an hermetic seal, the combination of means for simultaneously cutting a center or core and a liner or gasket from presented web material, stack holders for receiving respectively said core or center and said liner or gasket, and means for removing said stack holders when a predetermined quantity of pieces are positioned thereon.

23. In a machine for forming can end liners or gaskets adapted to be folded into the seam between a can end and can body to form an hermetic seal, the combination of means for simultaneously cutting a center or core and a liner or gasket from presented web material, stack holders for receiving respectively said core or center and said liner or gasket, and means for presenting successive sets of stack holders for filling.

24. In a machine for forming can end liners or gaskets adapted to be folded into the seam between a can end and can body to form an hermetic seal, the combination of means for simultaneously cutting a center or core and a liner or gasket from presented web material, stack holders for receiving respectively said core or center and said liner or gasket, and means for presenting successive steps of stack holders for filling, the action of said means being governed by the quantity of liners received by said stack holder.

25. In a machine for forming can end liners or gaskets adapted to be folded into the seam between a can end and can body to form an hermetic seal, the combination of cutting dies for cutting a core from presented web material, cutting dies for thereafter cutting a gasket or liner from about the aperture left by cutting of said core, and stack holders for receiving said cores and said gaskets or liners.

26. In a machine for forming can end liners or gaskets adapted to be folded into the seam between a can end and can body to form an hermetic seal, the combination of cutting dies for cutting a core from presented web material, cutting dies for thereafter cutting a gasket or liner from about the aperture left by cutting of said core, and stack holders for receiving said cores and said gaskets or liners, and means for actuating said cutting dies to simultaneously cut a core and a gasket at each operation.

27. In a machine for forming can end liners or gaskets adapted to be folded into the seam between a can end and can body to form an hermetic seal, the combination of cutting devices for cutting liners or gaskets from presented web material, a stack holder carrier, and a stack holder comprising a cylinder from which said gaskets may be threaded into tight contact to form a reinforced column of gaskets when the holder is filled.

28. In a machine for forming can end liners or gaskets adapted to be folded into the seam between a can end and can body to form an hermetic seal, the combination of cutting devices for cutting liners or gaskets from presented web material, a removable portable stack holder carrier, and a stack holder comprising a cylinder from which said gaskets may be threaded in tight contact to form a reinforced column of gaskets when the holder is filled.

29. In a machine for forming can end liners or gaskets adapted to be folded into the seam between a can end and can body to form an hermetic seal, the combination of cutting devices for cutting gaskets or liners from presented web material and stack holders movable into and out of position and adapted to receive said gaskets or liners and associated instrumentalities for moving said cutting devices with greater frequency than said stack holders.

30. In a machine for forming can end liners or gaskets adapted to be folded into the seam between a can end and can body to form an hermetic seal, the combination of cutting devices for cutting gaskets or liners from presented web material, a stack holder for receiving said liners as they are cut, a member of said cutting device moving said liner axially on to said stack holder.

31. In a machine for forming can end liners or gaskets adapted to be folded into the seam between a can end and can body to form an hermetic seal, the combination of cutting devices for cutting gaskets or liners from presented web material, a stack holder for receiving said liners as they are cut, a member of said cutting device moving said liner axially on said stack holder.

32. In a machine for forming can end liners or gaskets adapted to be folded into the seam between a can end and can body to form an hermetic seal, the combination of devices for cutting cores or centers and gaskets or liners from presented web material, stack holders for receiving said cut centers or cores and said gaskets, said cutting devices moving both said cores and gaskets axially to said holders.

33. In a machine for forming can end liners or gaskets adapted to be folded into the seam between a can end and can body to form an hermetic seal, the combination of devices for cutting cores or centers and gaskets or liners from presented web material, stack holders for receiving said cut centers or cores and said gaskets, said cutting devices moving both said cores and gaskets axially to said holders and in the same direction.

34. In a machine for forming can end liners or gaskets adapted to be folded into the seam between a can end and can body to form an hermetic seal, the combination of cutting devices for cutting gaskets or liners from presented web material, a stack holder carrier comprising a conveyor, a plurality of stack holders of uniform diameter adapted to be surrounded by said liners, and carried by said conveyor and associated instrumentalities for projecting said stack holders successively into a gasket receiving 35. In a machine for forming can end liners or gaskets adapted to be folded into the seam between a can end and can body to form an hermetic seal, the combination of cutting devices for cutting gaskets or liners from presented web material, a stack holder carrier comprising a conveyor, a plurality of stack holders carried by said conveyor and associated instrumentalities for projecting said stack holders successively into a gasket receiving position to be filled and moving said conveyor after each stack holder is filled, said means being controlled by the quantity of gaskets received by each stack holder.

36. In a machine for forming can end liners or gaskets adapted to be folded into the seam between a can end and can body to form an hermetic seal, the combination of devices for cutting the gaskets or liners from suitable presented web material, means for feeding said material which presents the same continuously to said cutting devices, and rotary web-measuring devices operated by the passage of said web of material, for stopping the effective action of said cutting devices when the passage of sufficient web does not take place.

37. In a machine for forming can end liners or gaskets adapted to be folded into the seam between a can end and can body to form an hermetic seal, the combination of devices for cutting the gaskets or liners, a web material which is continuously presented to said cutting devices, means for feeding said material, and devices comprising a measuring roll for halting said feeding when said web is interrupted to said cutting devices.

38. In a machine for forming can end liners or gaskets adapted to be folded into the seam between a can end and can body to form an hermetic seal, the combination of devices for cutting the gaskets or liners from suitable presented web material, means for feeding said material, means for measuring the web which passes for each action of said cutting devices, and electrically controlled devices cooperating with said measuring means for interrupting the effective action of said cutting devices when the feed is improper.

39. In a machine for forming can end liners or gaskets adapted to be folded into the seam between a can end and can body to form an hermetic seal, the combination of devices for cutting the gaskets or liners from suitable presented web material, means for feeding said material, and web-measuring means which have a cycle of movement that is completed by the passage of sufficient web and which control the said cutting devices and maintain the same in operation only during the performance of complete cycles of movement.

40. In a machine for forming can end liners or gaskets adapted to be folded into the seam between a can end and can body to form an hermetic seal, the combination of devices for cutting the gaskets or liners from suitable presented web material, means for feeding said material, devices for interrupting the action of said feed, and controls therefor rendered operable by improper feed of said web and including electric contacts connectible by absence of a continuous web and also a measuring roll operable only by a continuous web.

41. In a machine for forming can end liners or gaskets adapted to be folded into the seam between a can end and can body to form an hermetic seal, the combination of devices for cutting the gaskets or liners from suitable presented web material, means for feeding said material, devices for interrupting the action of said feed, and an electric control therefor rendered operable by improper feeding of said web and including contacts connectible by tearing of said web after it has left the cutting devices.

42. In a machine for forming can end liners or gaskets adapted to be folded into the seam between a can end and can body to form an hermetic seal, the combination of devices for cutting the gaskets or liners from suitable presented web material, means for feeding said material, devices for interrupting the action of said feed, and an electric control therefor rendered operable by improper feeding of said web, and a web-measuring device operated by the passage of the web and having a cycle of movement the completion of which maintains said electric control inoperative.

43. In a machine for forming can end liners or gaskets adapted to be folded into the seam between a can end and can body to form an hermetic seal, the combination of devices for cutting the gaskets or liners from suitable presented web material, means for feeding said material, devices for interrupting the action of said feed, and an electric control therefor rendered operable by improper feeding of said web and including contacts arranged to be separated by the web at the rear of the cutting devices their engagement being determined by the condition of the waste leaving the cutting devices at each operation.

44. In a machine for forming can end liners or gaskets adapted to be folded into the seam between a can end and can body to form an hermetic seal, the combination of devices for cutting the gaskets or liners from suitable presented web material, means for feeding said material, devices for interrupting the action of said feed, and an electric control therefor rendered operable by improper feeding of said web, said devices including a measuring member, an electric circuit for terminals normally open, one of said terminals being controlled by the movement of said cutting devices and the other by the movement of said measuring device, said last mentioned terminal being moved from contacting position by the action of said measuring device in measuring a desired substantially accurate quantity of material fed at each feeding operation.

45. In a machine for forming can end liners or gaskets adapted to be folded into the seam between a can end and can body to form an hermetic seal, the combination of devices for cutting the gaskets or liners from suitable presented web material, means for feeding said material, devices for interrupting the action of said feed, and an electric control therefor rendered operable by improper feeding of said web, said devices including contacts disposed on opposite sides of the waste received from said cutting devices and adapted to engage after each cutting operation if the waste material be of improper form after leaving said cutting devices.

46. In a machine for forming can end liners or gaskets adapted to be folded into the seam between a can end and can body to form an hermetic seal, the combination of devices for cutting the gaskets or liners from suitable presented web material, means for feeding said material, devices for interrupting the action of said feed, an electric control therefor rendered operable by improper feeding of said web, said devices including contacts disposed on opposite sides of the waste received from said cutting devices and adapted to engage after each cutting operation if the waste material be of improper form after leaving said cutting devices, and means for reciprocating certain of said contacts into and out of operative position synchronously with the action of said cutting devices.

47. In a machine for forming can end liners or gaskets adapted to be folded into the seam between a can end and can body to form an hermetic seal, including cutting devices for cutting gaskets or liners from presented web material, means for feeding said web material to said cutting devices, and counting device for counting the feeding actions of said feeding devices, and means for insuring the cutting of a number of gaskets or liners equal accurately to the number of feeding movements.

48. In a machine for forming can end liners or gaskets adapted to be folded into the seam between a can end and can body to form an hermetic seal, including cutting devices for cutting gaskets or liners from presented web material, means for feeding said web material to said cutting devices, and counting and recording devices for counting and recording the feeding actions of said feeding devices, and means for insuring the cutting of a number of gaskets or liners equal accurately to the number of feeding movements.

49. In a machine for forming can end liners or gaskets adapted to be folded into the seam between a can end and can body to form an hermetic seal, including cutting devices for cutting gaskets or liners from presented web material, means for feeding said web material to said cutting devices, and counting devices for counting the feeding actions of said feeding devices, means for insuring the cutting of a number of gaskets or liners equal accurately to the number of feeding movements, and means operating upon the absence of continuity of the web for interrupting the action of said counting devices at an improper feeding movement.

50. In a machine for forming can end liners or gaskets adapted to be folded into the seam between a can end and can body to form an hermetic seal, including cutting devices for cutting gaskets or liners from presented web material, means for feeding said web material to said cutting devices, and counting and recording devices for counting and recording the feeding actions of said feeding devices, and means for insuring the cutting of a number of gaskets or liners equal accurately to the number of feeding movements, and means for interrupting the action of said counting and recording devices at an improper cutting action, and web-measuring means controlling said interrupting means.

51. In a machine for forming can end liners or gaskets adapted to be folded into the seam between a can end and can body to form an hermetic seal, including cutting devices for cutting gaskets or liners from presented web material, means for feeding said web material to said cutting devices, and counting devices for counting the feeding actions of said feeding devices, means for insuring the cutting of a number of gaskets or liners equal accurately to the number of feeding movements, and means for interrupting the action of said counting devices when the end of said material leaves the machine.

52. A stack holder for a stack of paper gaskets or liners, comprising a cylinder having a smooth outer surface of diameter accurately equal to the internal diameter of the gaskets, and means for holding said gaskets in place.

53. A stack holder for a stack of paper gaskets or liners, comprising a cylinder having a smooth outer surface of diameter accurately equal to the internal diameter of the gaskets, and means for holding said gaskets in place, a removable spacing member spacing a stack of gaskets on said holder from an end thereof, and means insertable from the other end after the removal of said spacing member pushing said stack along said holder for securing said stack in place.

54. In a ring liner punching machine the combination of punching mechanism, means for feeding material to be punched and positioning the same relative to said punching mechanism, stack holders for receiving the ring liners as they are punched, a turret carrying said stack holders arranged in series, and means for rotating said turret and actuating said punching mechanism in timed relation.

55. In a ring liner punching machine the combination of punching mechanism, means for feeding and positioning material to be punched relative to said punching mechanism, a stack holder for receiving the ring liners as they are punched, and means moving with said punching mechanism for engaging and centering the stack holder at the time of its reception of the ring liner.

56. In a machine for punching ring liners from suitable material, the combination of punching mechanism, means for feeding a continuous web of said material in proper relation to the punching mechanism to be perforated thereby, means for temporarily arresting the operation of the punching mechanism said means comprising electric contacts arranged at each side of the path of the web and adapted to form an electric circuit when the web or a portion thereof is absent from its normal position, and secondary means for maintaining the inoperativeness of the machine which are set in operation by said temporary arresting means and which are independent of the movement of the punching mechanism.

CHARLES W. GRAHAM.